US012273909B2

(12) United States Patent
Sevindik et al.

(10) Patent No.: US 12,273,909 B2
(45) Date of Patent: Apr. 8, 2025

(54) METHODS AND APPARATUS FOR DATA TRAFFIC PRIORITIZATION IN SMALL-CELL WIRELESS SYSTEMS

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 117 days.

(21) Appl. No.: 17/084,476

(22) Filed: Oct. 29, 2020

(65) Prior Publication Data

US 2022/0141844 A1    May 5, 2022

(51) Int. Cl.
*H04W 72/566*     (2023.01)
*H04L 61/5007*    (2022.01)
(Continued)

(52) U.S. Cl.
CPC ....... *H04W 72/569* (2023.01); *H04L 61/5007* (2022.05); *H04W 72/56* (2023.01); *H04W 76/12* (2018.02)

(58) Field of Classification Search
CPC ............. H04W 72/1242; H04W 76/10; H04W 76/12; H04L 61/5007
See application file for complete search history.

(56) References Cited

U.S. PATENT DOCUMENTS 10,230,562 B2    3/2019  Kim et al.
10,595,256 B1 *  3/2020  Marupaduga ......... H04W 36/26
(Continued)

FOREIGN PATENT DOCUMENTS

CA          3097144 A1 * 10/2019  ............ H04J 3/1652
WO  WO-2019204336 A1 * 10/2019  ............ H04J 3/1652
WO  WO-2021014197 A1    1/2021

OTHER PUBLICATIONS

Deering., et al., "Internet Protocol, Version 6 (Ipv6) Specification, IETF RFC 2460," Dec. 1998, 39 pages.
(Continued)

*Primary Examiner* — Saad A. Waqas
(74) *Attorney, Agent, or Firm* — Patent Beach PC

(57) ABSTRACT

Methods and apparatus for prioritizing data traffic in small-cell wireless system. In one embodiment, the system utilizes "quasi-licensed" CBRS (Citizens Broadband Radio Service) wireless spectrum in conjunction with a wireless communication network (e.g., 3GPP 4G-LTE or 5G-NR-based). A "traffic profile" message is used to prioritize the data traffic. In one variant, the traffic profile message is generated by a Customer Premises Equipment (CPE) such as a CBRS FWA, and includes data related to CPE identification, default bearer identification, number of client devices served by the CPE (e.g., via a wireless router connected to the CPE), traffic type and/or priority level associated with each client device and/or data traffic type, etc. In another variant, the base station provides data services to a plurality of fixed wireless access (FWA) apparatus installed at user or subscriber premises of a network based on prioritization according to the present disclosure.

20 Claims, 20 Drawing Sheets

(51) Int. Cl.
*H04W 72/56* (2023.01)
*H04W 76/12* (2018.01)

(56) References Cited

U.S. PATENT DOCUMENTS

| | | |
|---|---|---|
| 11,184,212 B2 | 11/2021 | Chen |
| 2006/0285522 A1 | 12/2006 | Kim et al. |
| 2008/0225742 A1 | 9/2008 | Cho et al. |
| 2009/0201861 A1 | 8/2009 | Kotecha |
| 2011/0047287 A1 | 2/2011 | Harrang et al. |
| 2011/0099278 A1 | 4/2011 | Marr et al. |
| 2016/0323912 A1 | 11/2016 | Nakamura et al. |
| 2017/0373789 A1 | 12/2017 | Huang et al. |
| 2018/0248646 A1 | 8/2018 | Gustav et al. |
| 2018/0352473 A1 | 12/2018 | Gunasekara et al. |
| 2019/0037418 A1 | 1/2019 | Gunasekara et al. |
| 2019/0280763 A1 | 9/2019 | Smyth et al. |
| 2019/0373301 A1 | 12/2019 | Gunasekara et al. |
| 2020/0169962 A1 | 5/2020 | Fakoorian et al. |
| 2021/0143885 A1 | 5/2021 | Marcus et al. |
| 2021/0185738 A1* | 6/2021 | John .................. H04W 76/30 |
| 2021/0409962 A1* | 12/2021 | Kwok .................. H04W 16/14 |
| 2022/0045906 A1 | 2/2022 | Petersen et al. |
| 2022/0131747 A1 | 4/2022 | Sevindik et al. |
| 2022/0140939 A1 | 5/2022 | Sevindik |
| 2023/0254086 A1 | 8/2023 | Hao et al. |

OTHER PUBLICATIONS

"Evolved Universal Terrestrial Radio Access (E-UTRA); Physical layer procedures," 3GPP Technical Specification 36.213 v16.1.0, Apr. 2020.

"Internet Protocol, DARPA Internet Program, Protocol Specification", IETF RCF 791, Sep. 1981, 50 pages.

3GPP TS 23.203., 3rd Generation Partnership Project; Technical Specification Group Services and System Aspects; Policy and Charging Control Architecture; (Release 16), v16.2.0 dated Dec. 2019.

Banerji S., et al., "On IEEE 802.11: Wireless LAN Technology," 2013, vol. 3(4), 19 pages.

Deering, S., et al., "Internet Protocol, Version 6 (IPv6) Specification," Internet Engineering Task Force (IETF) RFC 2460, Dec. 1998, 39 pages.

Kadir E.A., et al., "Performance Analysis of Wireless LAN 802.11 Standard for e-Learning", 2016 International Conference on Information and Communication Technology, 6 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

Wi-Fi Direct, "Wi-Fi Peer-to-Peer (P2P) Specification," Wi-Fi Alliance, Version 1.5, 2014, 183 pages.

3GPP TS 23.107., "3rd Generation Partnership Project; Technical Specification Group Services and System Aspects," Quality of service (QoS) concept and architecture, (Release 6), v16.2.0 dated Mar. 2006.

ETSI TR 121 905 V15.1.0 Apr. 2019, Digital cellular telecommunications system (Phase 2+) (GSM), Universal Mobile Telecommunications System (UMTS), LTE, Vocabulary for 3GPP Specifications, 68 Pages.

ETSI TS 123 203 V15.5.0 Oct. 2019 Digital cellular telecommunications system (Phase 2+) (GSM), Universal Mobile Telecommunications System (UMTS), LTE; Policy and charging control architecture version 15.5.0 Release 15, 268 pages.

ETSI TS 123 501 V15.2.0 Jun. 2018, System architecture for the 5G System 3GPP TS 23.501 version 15.2.0 Release 15, 219 Pages.

ETSI TS 123 502 V15.9.0 Mar. 2020 Procedures for the 5G System (5GS) 3GPP TS 23.502 version 15.9.0 Release 15, 364 pages.

\* cited by examiner

| E-UTRA Operating Band | Uplink (UL) operating band BS receive UE transmit $F_{UL\_low} - F_{UL\_high}$ | | | Downlink (DL) operating band BS transmit UE receive $F_{DL\_low} - F_{DL\_high}$ | | | Duplex Mode |
|---|---|---|---|---|---|---|---|
| 2 | 1850 MHz | – | 1910 MHz | 1930 MHz | – | 1990 MHz | FDD |
| 4 | 1710 MHz | – | 1755 MHz | 2110 MHz | – | 2155 MHz | FDD |
| 5 | 824 MHz | – | 849 MHz | 869 MHz | – | 894 MHz | FDD |
| 7 | 2500 MHz | – | 2570 MHz | 2620 MHz | – | 2690 MHz | FDD |
| 10 | 1710 MHz | – | 1770 MHz | 2110 MHz | – | 2170 MHz | FDD |
| 12 | 699 MHz | – | 716 MHz | 729 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| 18 | 815 MHz | – | 830 MHz | 860 MHz | – | 875 MHz | FDD |
| 19 | 830 MHz | – | 845 MHz | 875 MHz | – | 890 MHz | FDD |
| 23 | 2000 MHz | – | 2020 MHz | 2180 MHz | – | 2200 MHz | FDD |
| 25 | 1850 MHz | – | 1915 MHz | 1930 MHz | – | 1995 MHz | FDD |
| 26* | 814 MHz | – | 849 MHz | 859 MHz | – | 894 MHz | FDD |
| 29 | N/A | | | 717 MHz | – | 728 MHz | FDD |
| 30 | 2305 MHz | – | 2315 MHz | 2350 MHz | – | 2360 MHz | FDD |
| 35 | 1850 MHz | – | 1910 MHz | 1850 MHz | – | 1910 MHz | TDD |
| 36 | 1930 MHz | – | 1990 MHz | 1930 MHz | – | 1990 MHz | TDD |
| 38 | 2570 MHz | – | 2620 MHz | 2570 MHz | – | 2620 MHz | TDD |
| 40 | 2300 MHz | – | 2400 MHz | 2300 MHz | – | 2400 MHz | TDD |
| 41 | 2496 MHz | – | 2690 MHz | 2496 MHz | – | 2690 MHz | TDD |
| 42 | 3400 MHz | – | 3600 MHz | 3400 MHz | – | 3600 MHz | TDD |
| 43 | 3600 MHz | – | 3800 MHz | 3600 MHz | – | 3800 MHz | TDD |
| 46 | 5150 MHz | – | 5925 MHz | 5150 MHz | – | 5925 MHz | TDD |
| 66 | 1710 MHz | – | 1780 MHz | 2110 MHz | – | 2200 MHz | FDD |
| 70 | 1695 MHz | – | 1710 MHz | 1995 MHz | – | 2020 MHz | FDD |

FIG. 5B (Prior art)

METHODS AND APPARATUS FOR DATA TRAFFIC PRIORITIZATION IN SMALL-CELL WIRELESS SYSTEMS

RELATED APPLICATIONS

This application is generally related to subject matter of co-owned and co-pending U.S. patent application Ser. No. 17/083,144 entitled "METHODS AND APPARATUS FOR ENHANCING SCHEDULER FAIRNESS IN SMALL-CELL WIRELESS SYSTEMS" filed Oct. 28, 2020 and which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless equipment, and specifically, in one or more exemplary embodiments, to methods and apparatus for wireless network infrastructure management including characterization of data traffic and wireless nodes, and allocation of bandwidth based thereon.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48), and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., 3GPP NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, wireless small cells, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc. See FIG. 1B, wherein multiple different CBSD/xNB devices 131 serving heterogeneous types of users/clients are backhauled to a common CMTS.

Another key component in the headend 102, is the Edge QAM modulator (EQAM) 105. The EQAM receives e.g., an IP unicast or multicast MPEG transport stream packet over a GigE (Gigabit Ethernet) interface, and produces transport stream on one or more RF channels for transmission over the HFC distribution network 121. The EQAM can also perform other functions such as re-stamp of Program Clock Reference (PCR) timestamps such as for de-jitter processing. Output from the EQAM 105 is combined with video signals (e.g., SDV, analog, etc.) for downstream transmission by the combiner logic 107.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 202, (ii) Priority Access tier 204, and (iii) General Authorized Access tier 206. See FIG. 2. The three tiers are coordinated through one or more dynamic Spectrum Access Systems (SAS) 302 as shown in FIG. 3 (including e.g., Band 48 therein).

Incumbent Access (existing DOD and satellite) users 202 include authorized federal and grandfathered Fixed Satellite Service (FSS) users currently operating in the 3.5 GHz band shown in FIG. 2. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 204 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 206 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels.

The FCC's three-tiered spectrum sharing architecture of FIG. 2 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 131 (see FIG. 3) can only operate under authority of a centralized Spectrum Access System (SAS) 302. Rules are optimized for small-cell use, but also accommodate point-to-point and point-to-multi-point, especially in rural areas.

Under the FCC system, the standard SAS 302 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 3, these functions are provided for by, inter alia, an incumbent detection (i.e., environmental sensing) function 307 configured to detect use by incumbents, and an incumbent information function 309 configured to inform the incumbent when use by another user occurs. An FCC database 311 is also provided, such as for PAL license validation, CBSD registration, and other functions.

An optional Domain Proxy (DP) 308 is also provided for in the FCC architecture. Each DP 308 includes: (1) SAS interface GW including security; (2) directive translation between CBSD 131 and domain commands; (3) bulk CBSD directive processing; and (4) interference contribution reporting to the SAS.

A domain is defined is any collection of CBSDs 131 that need to be grouped for management; e.g.: large enterprises, venues, stadiums, train stations. Domains can be even larger/broader in scope, such as for example a terrestrial operator network.

Moreover, domains may or may not use private addressing. A Domain Proxy (DP) 308 can aggregate control information flows to other SAS, such as e.g., a Commercial SAS (CSAS, not shown), and generate performance reports, channel requests, heartbeats, etc.

CBSDs 131 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 4 illustrates a typical prior art CBRS-based CPE (consumer premises equipment)/FWA architecture 400 for a served premises (e.g., user residence), wherein the CPE/FWA 403 is backhauled by a base station (e.g., eNB or gNB) 131, the latter which is backhauled by the DOCSIS network shown in FIG. 1A. A PoE (Power over Ethernet) injector system 404 is used to power the CPE/FWA 403 as well as provide Ethernet (packet connectivity for the CPE/FWA radio head to the home router 405).

Additionally, new wireless systems and small cells are being fielded, including in new frequency bands which may be licensed, unlicensed, or allocated under a shared model similar to that used for CBRS (see e.g., FIG. 5A, illustrating new Band 71 with the 600 MHz region, and FIG. 5B showing e.g., Bands 12-17 in the 700 MHz region).

3GPP QoS Class Identifier (QCI)—

Per 3GPP TS 23.203, entitled 3rd Generation Partnership Project; Technical Specification Group Services and System Aspects; Policy and charging control architecture (Release 16), v16.2.0, dated December 2019, which is incorporated herein by reference in its entirety, QoS (Quality of Service) Class Identifier (QCI) (also known colloquially as "Quality Class Index") refers to a scalar that is used as a reference to a specific packet forwarding behavior (e.g., packet loss rate, packet delay budget) to be provided to a SDF (Service Data Flow). It may be implemented in the access network as a reference to node specific parameters that control the packet forwarding treatment (e.g., scheduling weights, admission thresholds, queue management thresholds, link layer protocol configuration, etc.), which have been pre-configured by the network operator at a specific node (e.g., eNodeB). For example, when a user equipment (UE) first connects to a base station, the UE is assigned a default bearer, which is associated with a QCI value of 9.

Each QCI parameter value has a set of associated characteristics as shown in the following Table 1 (derived from 3GPP TS 23.203):

TABLE 1

| QCI | Resource Type | Priority | Packet Delay Budget/Error rate | Typical Services |
|---|---|---|---|---|
| 1 | GBR | 2 | 100 ms/$10^{-2}$ | Conversational Voice |
| 2 | GBR | 4 | 150 ms/$10^{-3}$ | Conversational Video (Live Streaming) |
| 3 | GBR | 3 | 50 ms/$10^{-3}$ | Real Time Gaming, V2X messages |
| 4 | GBR | 5 | 300 ms/$10^{-6}$ | Non-Conversational Video (Buffered Streaming) |

TABLE 1-continued

| QCI | Resource Type | Priority | Packet Delay Budget/Error rate | Typical Services |
|---|---|---|---|---|
| 65 | GBR | 0.7 | 75 ms/$10^{-2}$ | Mission Critical user plane Push To Talk voice (e.g., MCPTT) |
| 66 | GBR | 2 | 100 ms/$10^{-2}$ | Non-Mission-Critical user plane Push To Talk voice |
| 75 | GBR | 2.5 | 50 ms/$10^{-2}$ | V2X messages |
| 5 | non-GBR | 1 | 100 ms/$10^{-6}$ | IMS Signaling |
| 6 | non-GBR | 6 | 300 ms/$10^{-6}$ | Video (Buffered Streaming) TCP-Based (for example, www, email, chat, ftp, P2P and the like) |
| 7 | non-GBR | 7 | 100 ms/$10^{-3}$ | Voice, Video (Live Streaming), Interactive Gaming |
| 8 | non-GBR | 8 | 300 ms/$10^{-6}$ | Video (Buffered Streaming) TCP-Based (for example, www, email, chat, ftp, P2P and the like) |
| 9 | non-GBR | 9 | 300 ms/$10^{-6}$ | Video (Buffered Streaming) TCP-Based (for example, www, email, chat, ftp, P2P and the like). Typically used as default bearer |
| 69 | non-GBR | 0.5 | 60 ms/$10^{-6}$ | Mission Critical delay sensitive signaling (e.g., MC-PTT signaling) |
| 70 | non-GBR | 5.5 | 200 ms/$10^{-6}$ | Mission Critical Data (e.g. example services are the same as QCI 6/8/9) |
| 79 | non-GBR | 6.5 | 50 ms/$10^{-2}$ | V2X messages |
| 80 | non-GBR | 6.8 | 10 ms/$10^{-6}$ | Low latency eMBB applications (TCP/UDP-based); Augmented Reality |
| 82 | GBR | 1.9 | 10 ms/$10^{-4}$ | Discrete Automation (small packets) |
| 83 | GBR | 2.2 | 10 ms/$10^{-4}$ | Discrete Automation (big packets) |
| 84 | GBR | 2.4 | 30 ms/$10^{-5}$ | Intelligent Transport Systems |
| 85 | GBR | 2.1 | 5 ms/$10^{-5}$ | Electricity Distribution-high voltage |

Unaddressed Issue of Prioritizing Data Traffic

In existing network small cell deployments such as described above with respect to FIG. 1A, each CPE (e.g., a 3GPP-based CBRS FWA) behaves as a typical UE (e.g., a smartphone) within the network. In normal 3GPP operation, data traffic associated with each UE is prioritized depending on traffic type. For instance, in an LTE network, a base station can send video traffic to a UE at a higher priority than, e.g., a web page traffic, and a packet scheduler (such as one disposed in the base station itself) plays a primary role in such data traffic/packet prioritization.

In the above network having FWA apparatus operating as CPE, the CPE/FWA can send and receive data traffic from, e.g., a wireless router or AP (access point) at the user premises (e.g., user's home), which may be serving multiple client devices. That is, while a CPE/FWA may behave like a typical UE (e.g., with SIM card, chipset like that of a smartphone, etc.), data traffic to and from the CPE/FWA may be associated with more than one client device, because the CPE/FWA is used to backhaul the wireless router/AP (e.g., via a cable between the CPE/FWA and the router/AP), the latter to which the more than one client devices may be connected wirelessly. Therefore, a given CPE/FWA can encapsulate data traffic for multiple distinct client devices connected to the wireless router. Moreover, data bearers assigned for various types of data traffic associated with these different client devices cannot be differentiated based on the client device (i.e., the CPE/FWA and its backhaul have no way of differentiating different traffic types associated with different client devices at a given premises), and hence any QCI-based assignments are necessarily on a per-CPE/FWA basis (as opposed to a per-client or even per-process basis). This approach is not optimal, since all traffic associated with the CPE/FWA for its WLAN clients is either prioritized or not prioritized, and when prioritized is a waste of bandwidth/resources of the wireless link between the CPE and the serving base station.

In the foregoing scenario, neither the CPE/FWA nor a base station (e.g., CBSD) that may have a direct connection with the CPE/FWA can differentiate which client device is consuming which type of data (e.g., video, voice, etc.). With a fixed amount of radio frequency (RF) resources (e.g., channels) available to serve one or more such CPE/FWA that are connected to the base station, a "blind" data delivery to the client devices served via each CPE/FWA may not be the most efficient, and fail to maximize e.g., quality of experience (QoE) for users of the client devices consuming the delivered data. That is, the QoE for the users may not be maximized in the foregoing situation because the base station and the CPE/FWA cannot identify which client device may be consuming, e.g., latency-sensitive data traffic (e.g., for video streaming), etc., and which data traffic which may require prioritization.

Hence, improved methods and apparatus are needed to prioritize the data traffic for each client device served by the CPE/FWA. Such improved methods and apparatus should ideally enhance data services provided to the client devices, especially via the FWA apparatus, and also increase the efficiency of data communication within the network, resulting in higher QoE for consumers of the data services.

SUMMARY

The present disclosure addresses the foregoing needs by providing, inter alia, methods and apparatus for prioritization of data traffic for client devices served via CPE/FWA in a quasi-licensed wireless system.

In a first aspect of the disclosure, a computerized method for prioritizing data communications associated with a plurality of computerized client devices served by a wireless Customer Premises Equipment (CPE) is disclosed. In one embodiment, the computerized method includes: obtaining first data related to data traffic associated with one or more of the plurality of computerized client devices; characterizing the data traffic based at least on the obtained first; prioritizing the data traffic based at least on the characterizing; and wirelessly transmitting second data indicative of the prioritizing to a base station which is in data communication with the CPE.

In one variant, the obtaining of the first data comprises obtaining data associated with types of data traffic transacted by the plurality of client devices.

In another variant, the characterizing comprises determining identification data associated with the communication channel associated with the CPE, the identification data comprising an Internet Protocol (IP) address of the communication channel, the communication channel comprising a default data bearer assigned to the CPE by the base station.

In a further variant, the method further comprises performing, via the CPE, a packet analysis of data traffic generated from the plurality of computerized client devices.

In still another variant, the computerized method further comprises generating data representative of a data traffic profile associated with the CPE, the data traffic profile based at least on the obtained first data and the characterizing. In one implementation thereof, the transmitting of the data indicative of the prioritizing comprises transmitting the generated data representative of the data traffic profile associated with the CPE in an information element (IE) of a control plane (CP) protocol message.

In another variant, the base station comprises a CBRS (Citizens Broadband Radios Service) compliant CBSD (Citizens Broadband Service Device); the CPE comprises a CBRS FWA (fixed wireless access) apparatus; and the wirelessly transmitting comprises transmitting via one or more CBRS carriers within the frequency band of 3.550 to 3.700 GHz.

In a further variant, the prioritizing the data traffic based at least on the characterizing comprises allocating respective weight values to each of a plurality of different user plane (UP) data traffic types.

In a second aspect of the disclosure, a computerized network apparatus configured for data communication with a plurality of Customer Premises Equipment (CPE) via a data network is described. In one embodiment, the computerized network apparatus includes: processor apparatus; storage apparatus in data communication with the processor apparatus, the storage apparatus comprising at least one computer program configured to, when executed by the processor apparatus, cause the computerized network apparatus to: receive first data from each of the plurality of CPE; process the received first data; based at least on the processed first data, obtain second data relating to data traffic prioritization associated with each of the plurality of CPE; and based at least in part on the identified second data, allocate resources of the computerized network apparatus for data delivery to the plurality of CPE.

In one variant, the allocation of the one or more resources comprises a determination of a schedule related to the data delivery to the plurality of CPE. In one implementation thereof, the determination of the schedule related to the data delivery to the plurality of CPE comprises prioritization for queueing packet data for transmission to particular ones of wireless client devices associated with the plurality of CPE.

In another variant, the computerized network apparatus comprises a CBRS (Citizens Broadband Radios Service) compliant CBSD (Citizens Broadband Service Device); the plurality of CPE each comprises a CBRS FWA (fixed wireless access) apparatus; and the allocation of resources comprises allocation of at least (i) time frequency resources associated with an OFDM-based air interface of the CBSD, and (ii) establishment of at least one dedicated bearer to carry traffic associated with at least one of a wireless client device of at least one of the plurality of FWA apparatus.

In a further aspect, computerized premises apparatus configured for data communication with a computerized network apparatus and a plurality of computerized client devices in a wireless system is disclosed. In one embodiment, the computerized premises apparatus includes: processor apparatus; and storage apparatus in data communication with the processor apparatus, the storage apparatus comprising at least one computer program configured to, when executed by the processor apparatus, cause the computerized premises apparatus to: obtain first data related to the plurality of computerized client devices; prioritize data traffic associated with at least one computerized client device based at least on a data traffic type; and transmit data indicative of the prioritization to the computerized network apparatus.

In one variant, the prioritized data traffic comprises data traffic associated with latency-sensitive application operating on the at least one computerized client device.

In another aspect, a method for generating a traffic profile message data is disclosed.

In a further aspect, a database to maintain data useful for generation of a traffic profile message for one or more client devices served by a CPE/FWA is disclosed.

In another aspect, a premises apparatus for identifying data associated with each of a plurality of connected wireless client devices is disclosed.

In another aspect, a network apparatus for allocating resources according to prioritization generated by a premises apparatus is disclosed.

A network architecture comprising a base station, one or more CPE/FWA, and one or more client devices connected to each CPE/FWA via a wireless router.

In a further aspect of the disclosure, computer readable apparatus including a non-transitory storage medium, the non-transitory medium including at least one computer program having a plurality of instructions is disclosed.

In one variant, the storage apparatus includes a storage medium configured to store one or more computer programs, such as on a base station. In one embodiment, the apparatus includes a program memory or HDD or SSD and stores one or more computer programs.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a wireless access point is disclosed. In one embodiment, the AP is disposed within an HFC premises infrastructure and is configured to interface with a plurality of WLAN clients and a backhauling CPE in order to facilitate per-device (and per-process) data traffic prioritization.

These and other aspects shall become apparent when considered in light of the disclosure provided herein.

BRIEF DESCRIPTION OF THE DRAWINGS

FIG. 5B is a tabular representation of various E-UTRA RF spectrum bands currently allocated.

Figure 1:
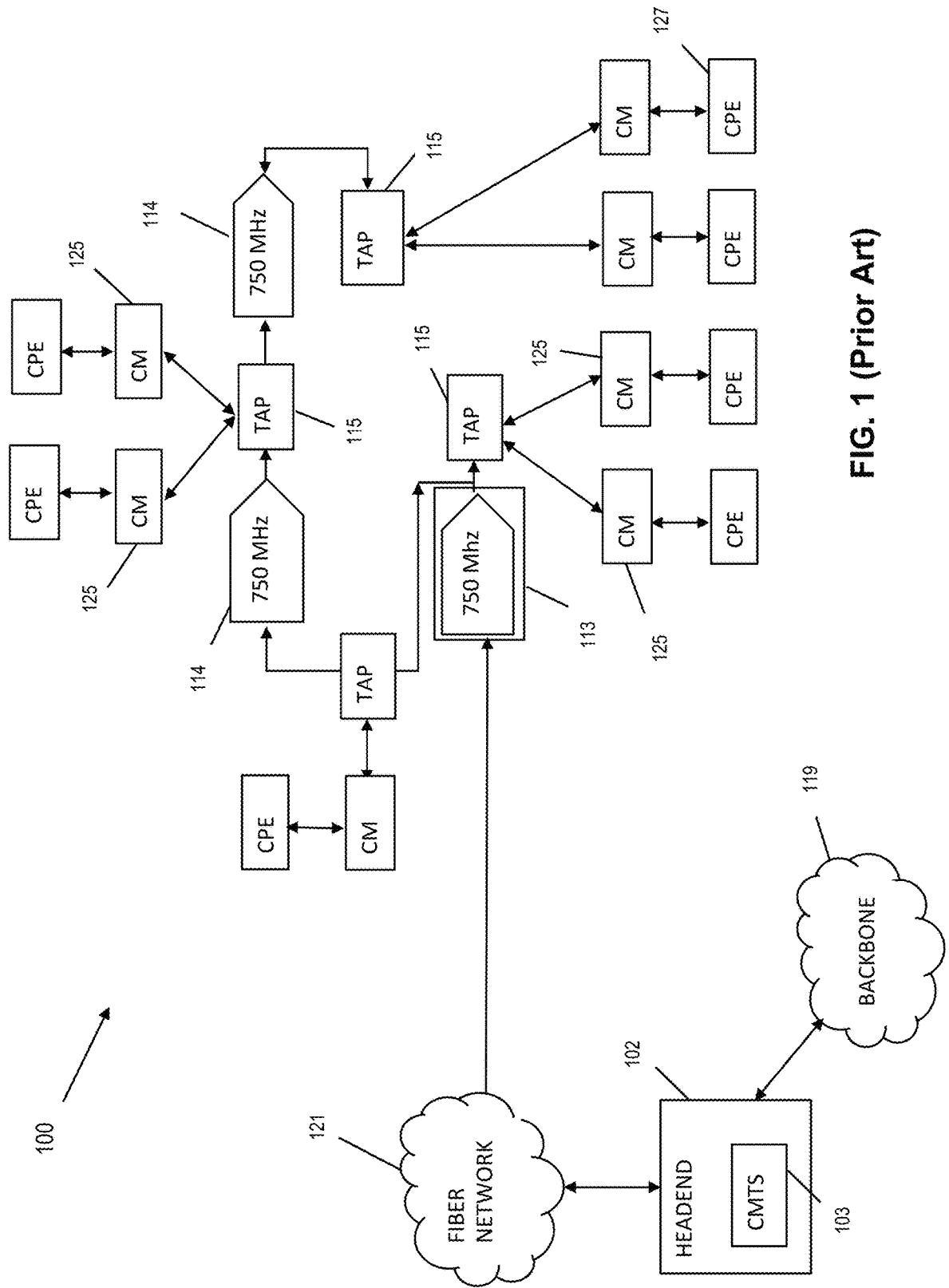
FIG. 1 is a block diagram illustrating a prior art hybrid fiber-coaxial (HFC) data network for delivery of data to end user devices.
Figure 1A:
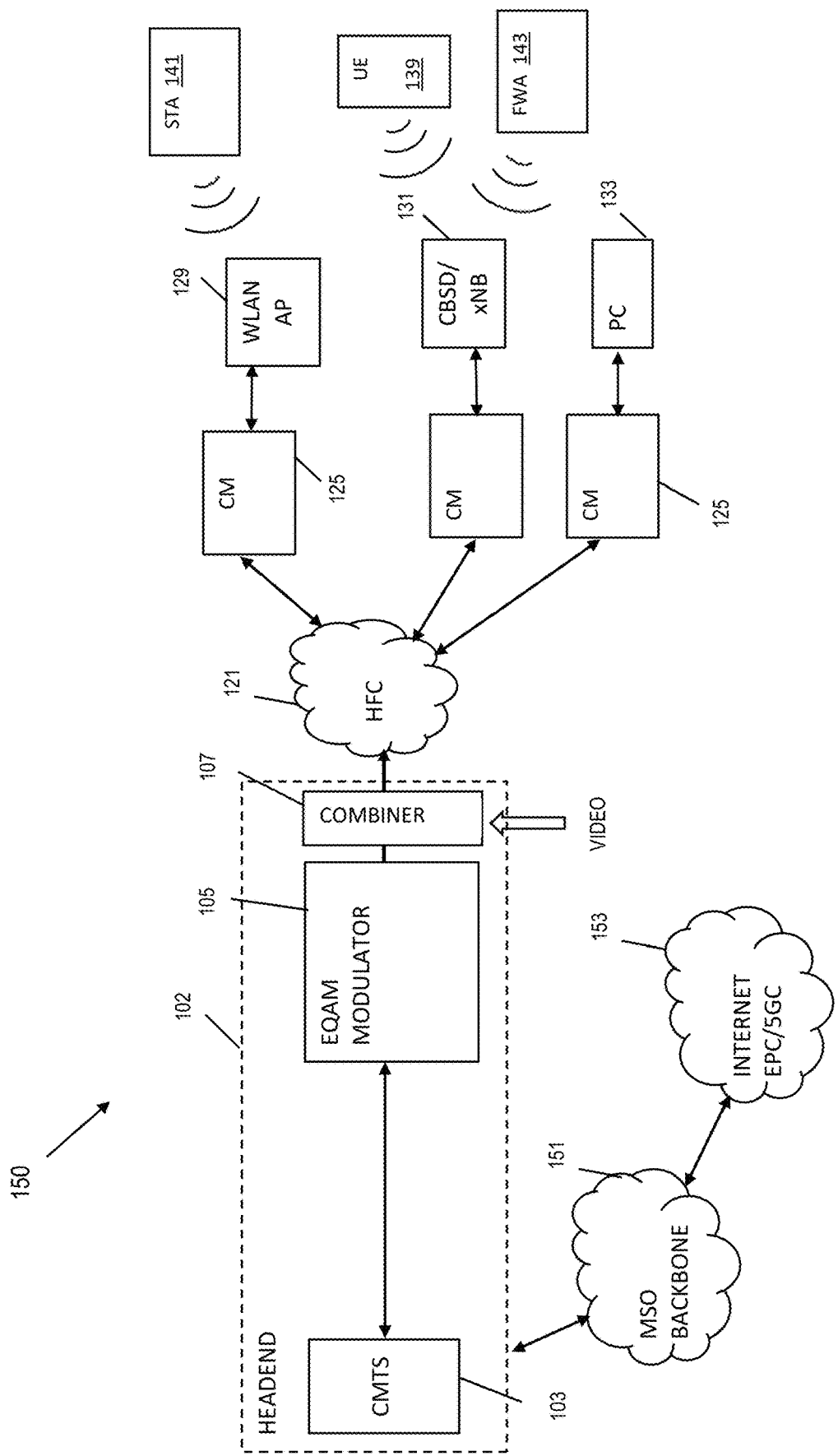
FIG. 1A is a block diagram illustrating the DOCSIS infrastructure of the HFC network of FIG. 1, and various types of backhauled premises devices.
Figure 1B:
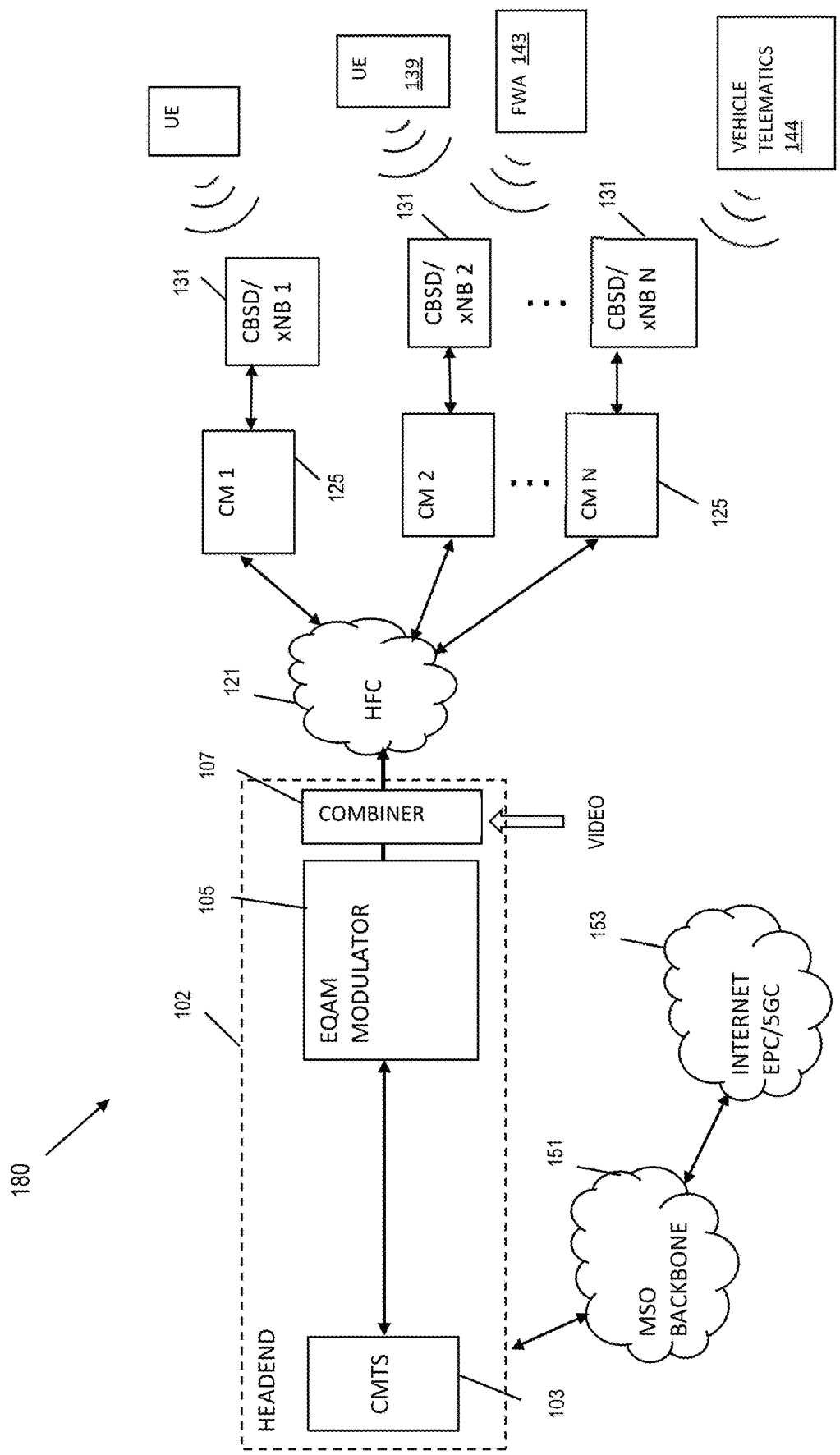
FIG. 1B is a block diagram illustrating the DOCSIS infrastructure of the HFC network of FIG. 1, wherein multiple different CBSD/xNB devices serving heterogeneous types of users/clients are backhauled to a common CMTS.
Figure 2:
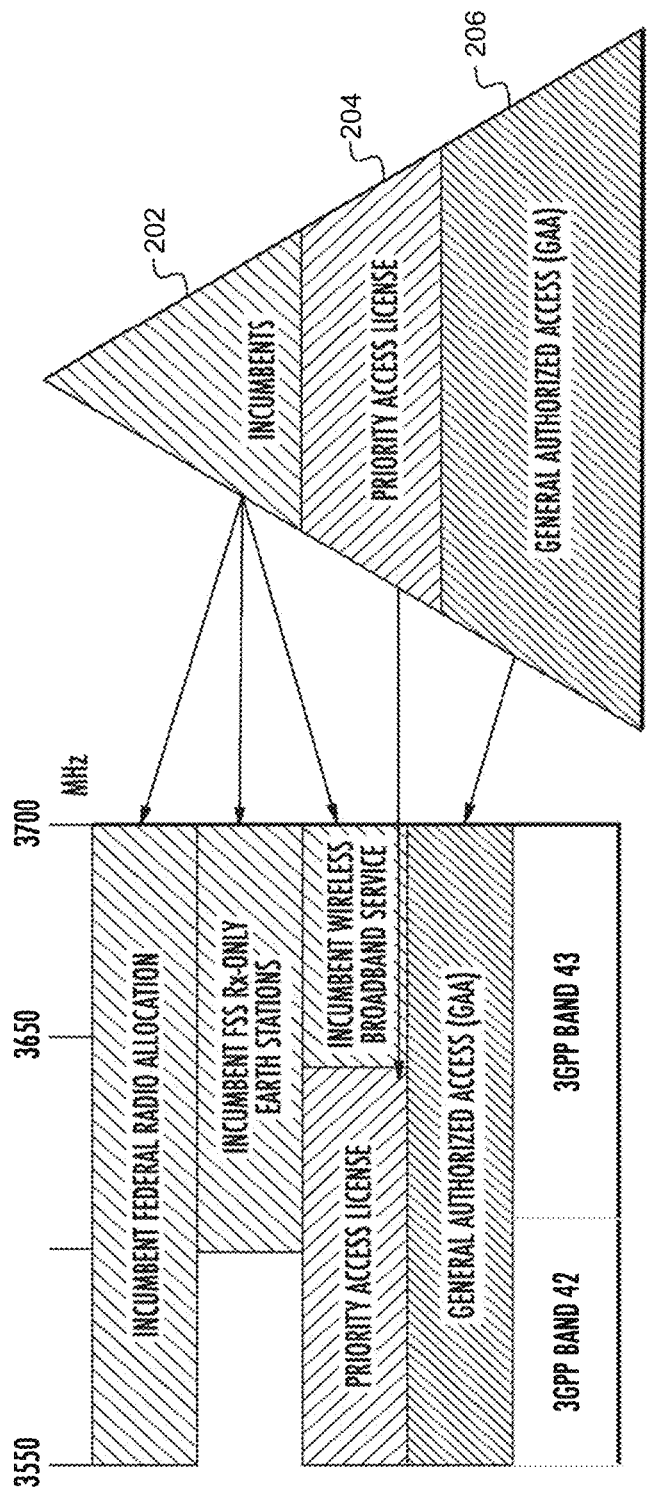
FIG. 2 is a graphical illustration of prior art CBRS (Citizens Broadband Radio Service) users and their relationship to allocated frequency spectrum in the 3.550 to 3.700 GHz band.
Figure 3:
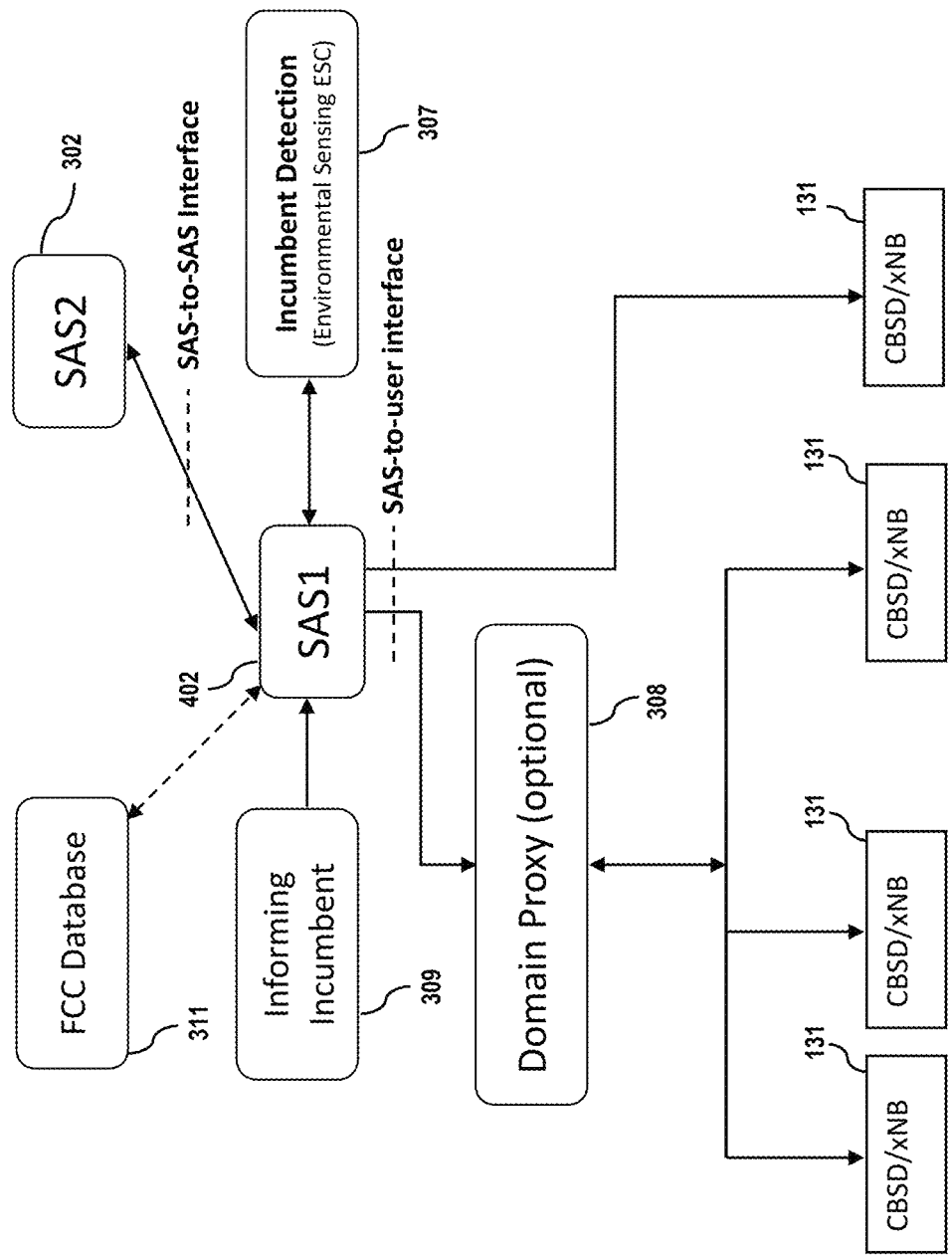
FIG. 3 is a functional block diagram illustrating a general architecture for the CBRS system of the prior art.
Figure 4:
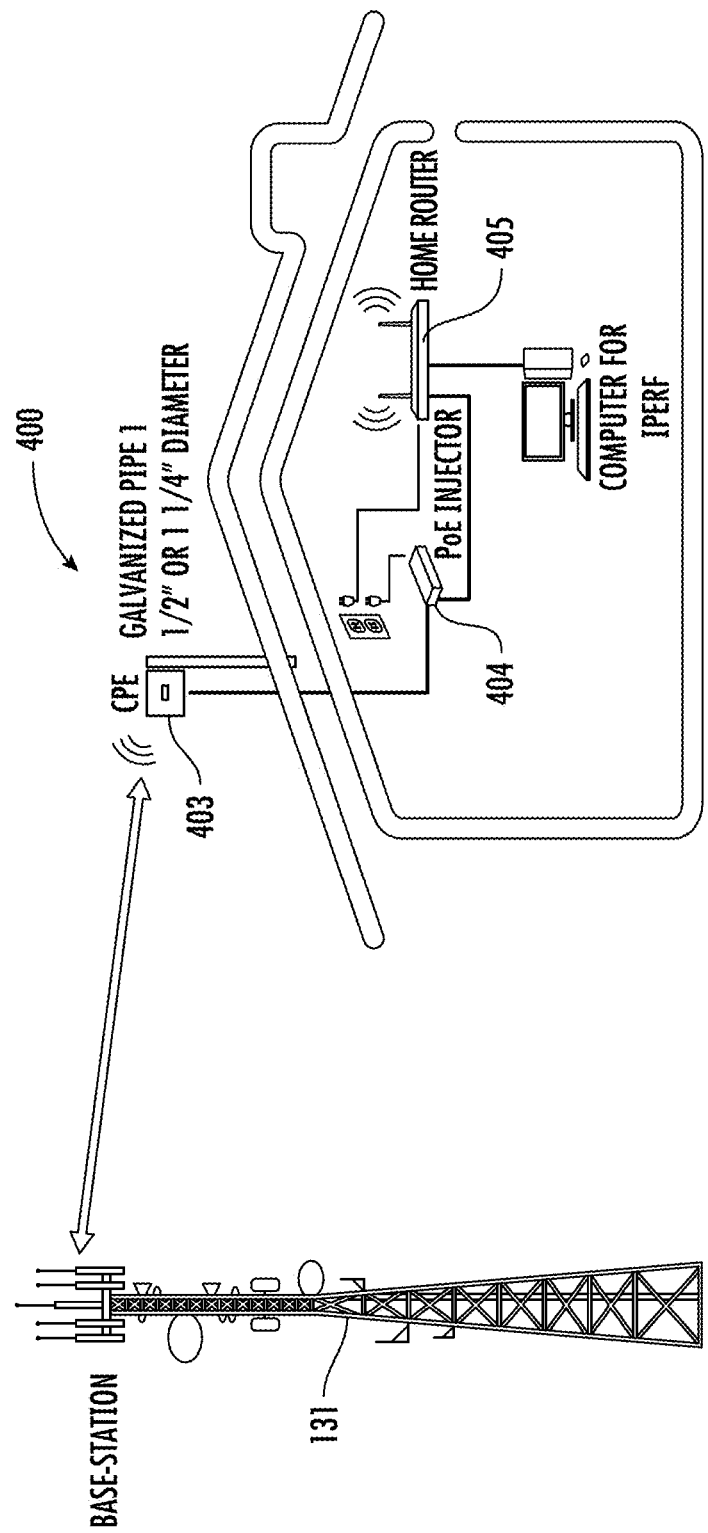
FIG. 4 is a graphical illustration of a prior art configuration for delivery of data from a base station to an end-user device (CPE/FWA) within the wireless coverage area of the base station.

All Figures© Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eU-TRAN) and gNBs (5G NR).

Overview

In one exemplary aspect, the present disclosure provides improved methods and apparatus for prioritizing data traffic associated with one or more client or user devices served by a wireless premises device that is wirelessly backhauled by a given base station. In one embodiment, the base station is configured as a CBRS CBSD utilizing 3GPP 4G and/or 5G technology, which backhauls a number of fixed wireless access (FWA) devices associated with respective premises of customers of a managed network operator (e.g., cable MSO). In one variant, the prioritization is effected via generation of traffic profile (TP) messaging associated with one or more client devices served by a given FWA backhauled by the base station; the various FWA and the serving base station exchange data which enables the base station to develop a prioritization/schedule on a per-client (versus per FWA) basis.

Exemplary embodiments of the base station and the premises FWA and supporting methods described herein can advantageously identify types of data traffic associated with the one or more client devices that are connected to, e.g., a wireless router connected to the CPE/FWA. This data is utilized by the enhanced CPE/FWA to generate the aforementioned traffic profile messages and send them to the base station.

In one variant, the enhanced CPE/FWA can dynamically assign a priority or weight value to certain types of data traffic that are, e.g., latency-sensitive (e.g., video streaming) or based on other QoS parameters. The base station can receive the prioritization or the weight data from the CPE/FWA in the traffic profile message and allocate its resources (e.g., RF resources) accordingly, including across multiple different FWA with multiple respective served client devices, based on traffic type. Alternatively, the FWA can merely provide raw (unweighted) data to the backhauling enhanced CBSD for computation (which may also hand off at least part of the analysis to another network computerized process).

In another variant, the enhanced CPE/FWA identifies the type(s) of data traffic associated with the client devices by performing packet analysis. Based on the data traffic type and other relevant information identified from the packet analysis, the FWA itself can in effect perform the prioritization by requesting dedicated bearer(s) for certain data traffic associated with one or more client devices.

The improved methods and apparatus for prioritizing data traffic according to the present disclosure can also work within a network topology which includes unmanaged and/or legacy CPE (e.g., those which do not generate any traffic profile message) by, in one implementation, prioritizing among only the data to be sent downstream to a given CPE/FWA which implements the methods of the present disclosure, so as to ensure "fairness" between the enhanced CPE/FWA and other unmanaged and/or legacy CPE by not impacting the RF channels/resources allocated to the other unmanaged and/or legacy CPE.

The disclosed methods and apparatus can also advantageously be utilized within a variety of topologies which provide wireless service to premises apparatus, as well as various types of base stations that support different types of radio access technologies (e.g., 3GPP 4G-LTE/5G-NR).

Detailed Description of Exemplary Embodiments

Exemplary embodiments of the apparatus and methods of the present disclosure are now described in detail. While these exemplary embodiments are described in the context of the previously mentioned base station (e.g., 3GPP eNB or gNB), wireless premises devices using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio or voice). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Exemplary Network Architecture—

Figure 6:
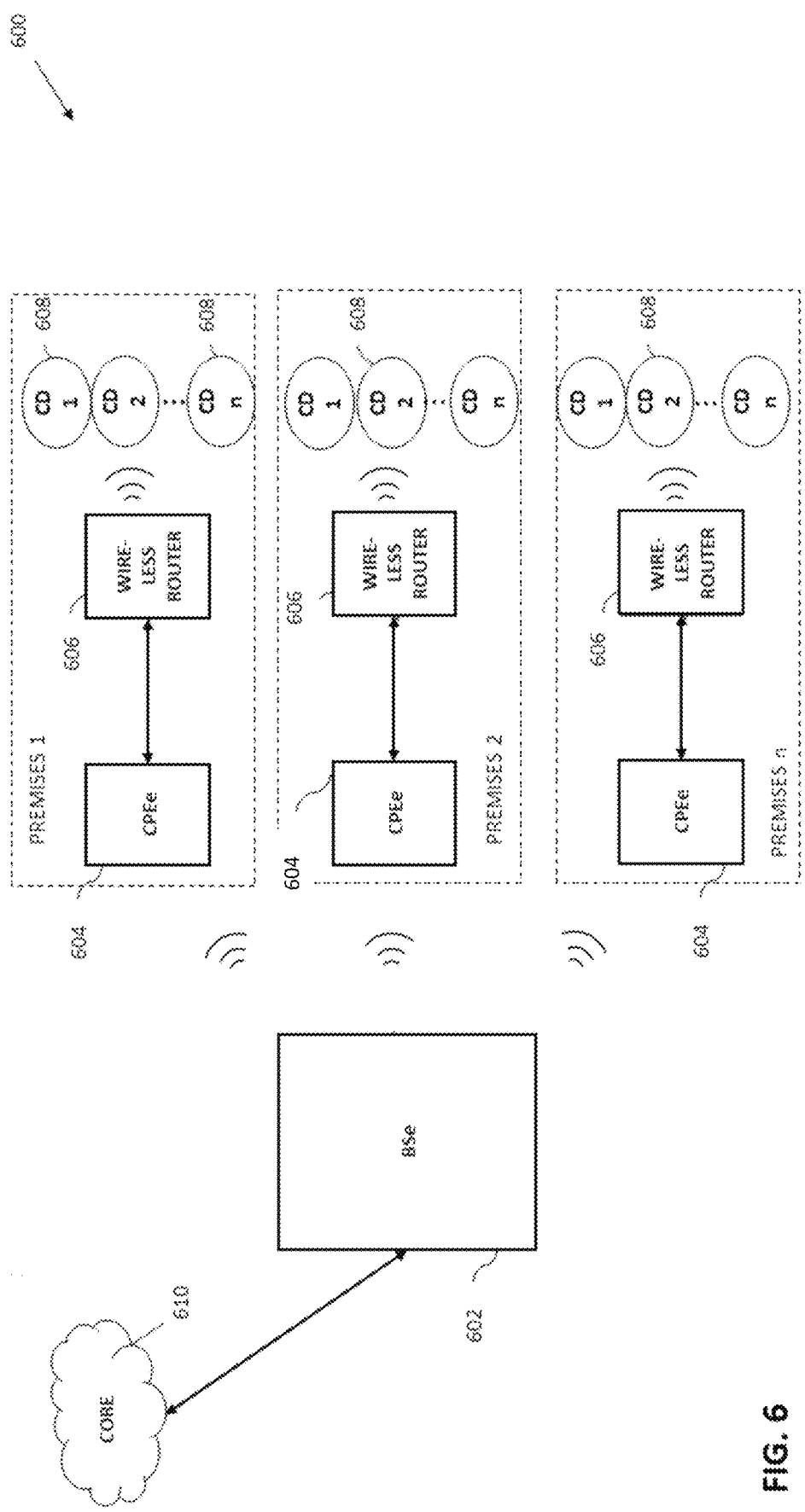
FIG. 6 is a block diagram illustrating one exemplary wireless delivery architecture according to the present disclosure, including enhanced base station (BSe) and enhanced CPE (CPEe).

FIG. 6 is a block diagram illustrating a general network architecture configured for data traffic prioritization and management according to the present disclosure.

As illustrated, the exemplary network architecture 600 includes at least one enhanced base station or BSe 602 (e.g., CBSD/xNB) connected to a core network 610, a plurality of CPEe 604, a plurality of respective wireless routers 606, and one or more client devices 608 connected to each wireless router 606. The CPEe may also support (backhaul) other devices such as DSTBs, modems, local small cells or access nodes, and IoT devices, not shown.

Figure 5A:
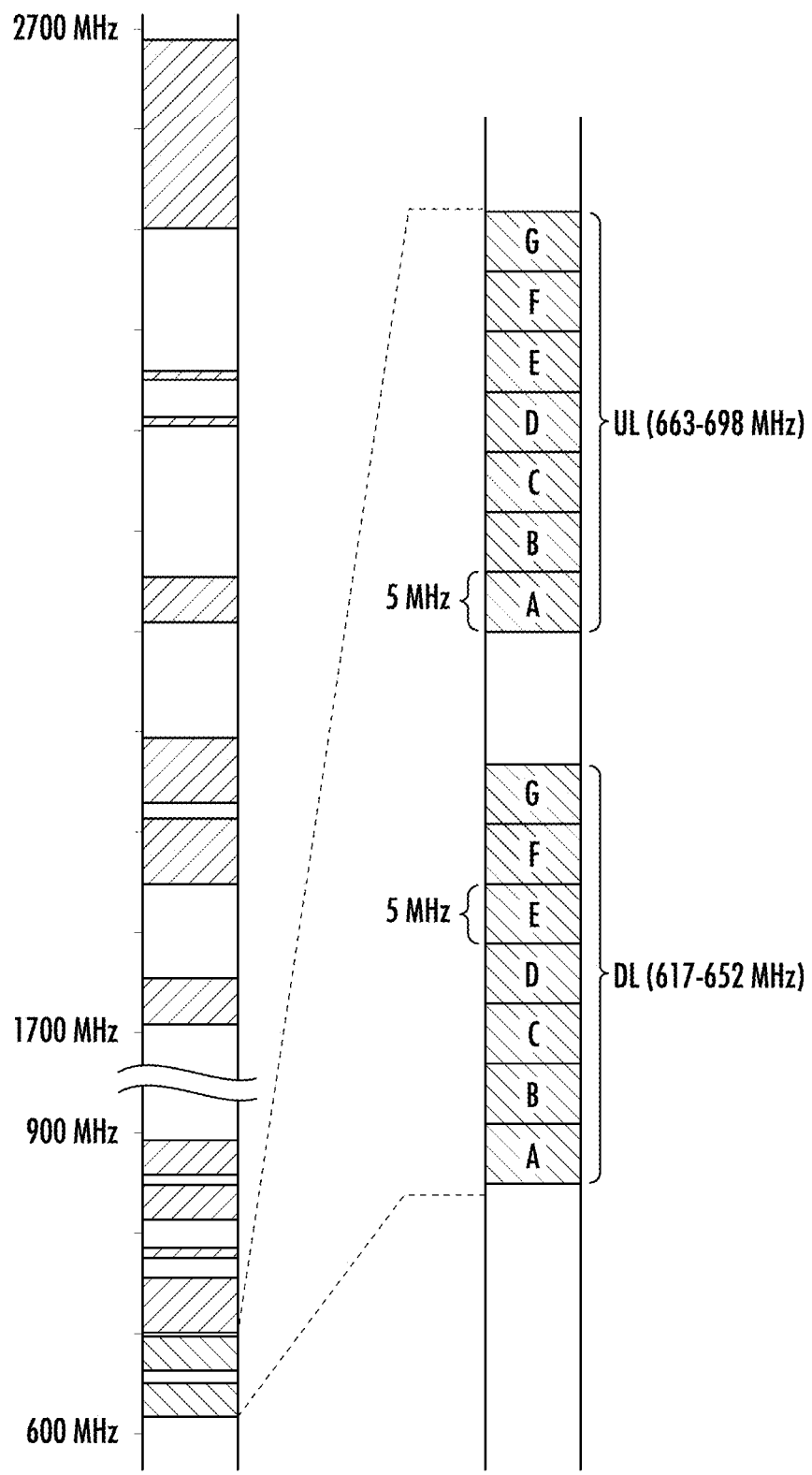
FIG. 5A is a graphical representation of Band 71 radio frequency (RF) spectrum currently allocated for use by the FCC.

In one exemplary embodiment, the BSe 602 is connected wirelessly to each CPEe 604. For example, a radio access technology such as 3GPP 4G-LTE or 5G-NR can be used, in conjunction with the CBRS technology discussed elsewhere herein, to establish the wireless connection between the base station 602 and the CPEe 604. Moreover, as referenced herein, different spectrum (and types of spectrum) can be used consistent with the architecture 600, including e.g., ultra-high bandwidth mmWave as set forth in recent 3GPP 5G NR standards, and/or licensed sub-1 GHz spectrum (see FIGS. 5A and 5B), with CBRS spectrum being merely exemplary.

Figure 8:
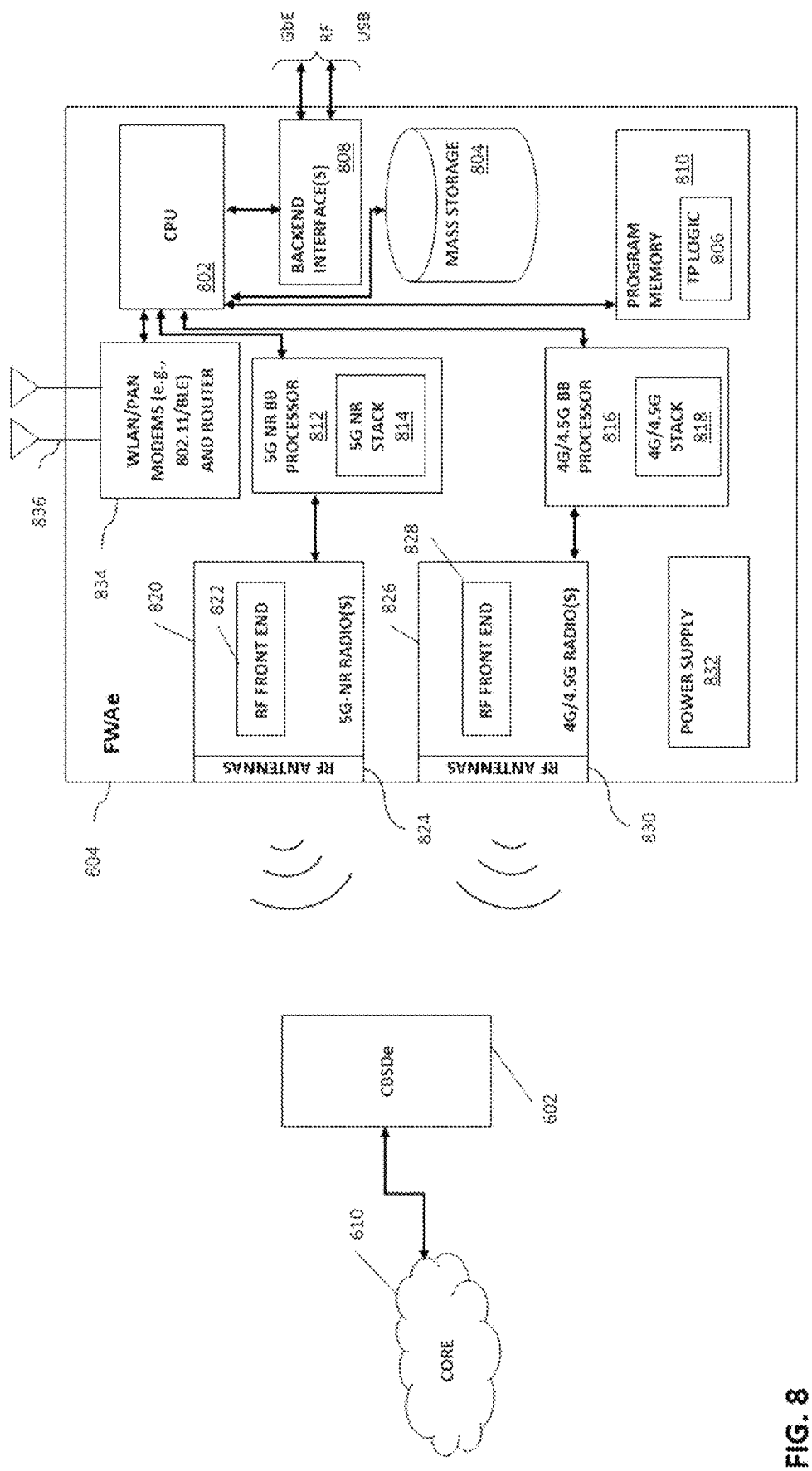
FIG. 8 is a block diagram illustrating an exemplary embodiment of an FWAe apparatus according to the present disclosure.

Each CPEe 604 is connected in the illustrated embodiment via cable such as a CAT-5 cable to a wireless router 606 to provide a local area network (WLAN) service for the connected devices 608. It may also be integrated within e.g., the CPEe 604 as shown in the embodiment of FIG. 8, discussed infra. A connected device 608 can be any device that can connect to the wireless router 606 (e.g., via Wi-Fi connection), to consume any type of data that can be transmitted through it. Examples of the connected devices 608 include but are not limited to a smartphone, tablet, a personal computer (including a laptop), a smart television, or USB-based "stick" appliance. As discussed elsewhere herein, the connected devices 608 can consume various different types of data traffic generated for, e.g., web browsing, VoIP calling, video streaming, etc., including simultaneously based on different applications operative on the client.

In one embodiment, the network components of the architecture 600 are managed by a common network operator (e.g., cable MSO), with the core network 610 comprising a 3GPP EPC or 5GC serving core functions for a plurality of BSe 602 distributed throughout an operating area. The individual served premises may be within urban, suburban, or rural areas in varying densities, such as within an MDU (e.g., apartment building), enterprise campus, or distributed throughout broader areas. Moreover, while one CPEe 604 is shown serving each premises, the various premises can be aggregated or "ganged" together such that one CPEe serves multiple premises users, such as where a single CPEe serves an apartment building or college dorm, with each individual user account having its own wireless router 606 and other premises client devices with all being backhauled by a single CPEe. This may be the case in e.g., mmWave based installations which have extremely high bandwidth and backhaul capability.

Enhanced Base Station (BSe)—

Figure 7:
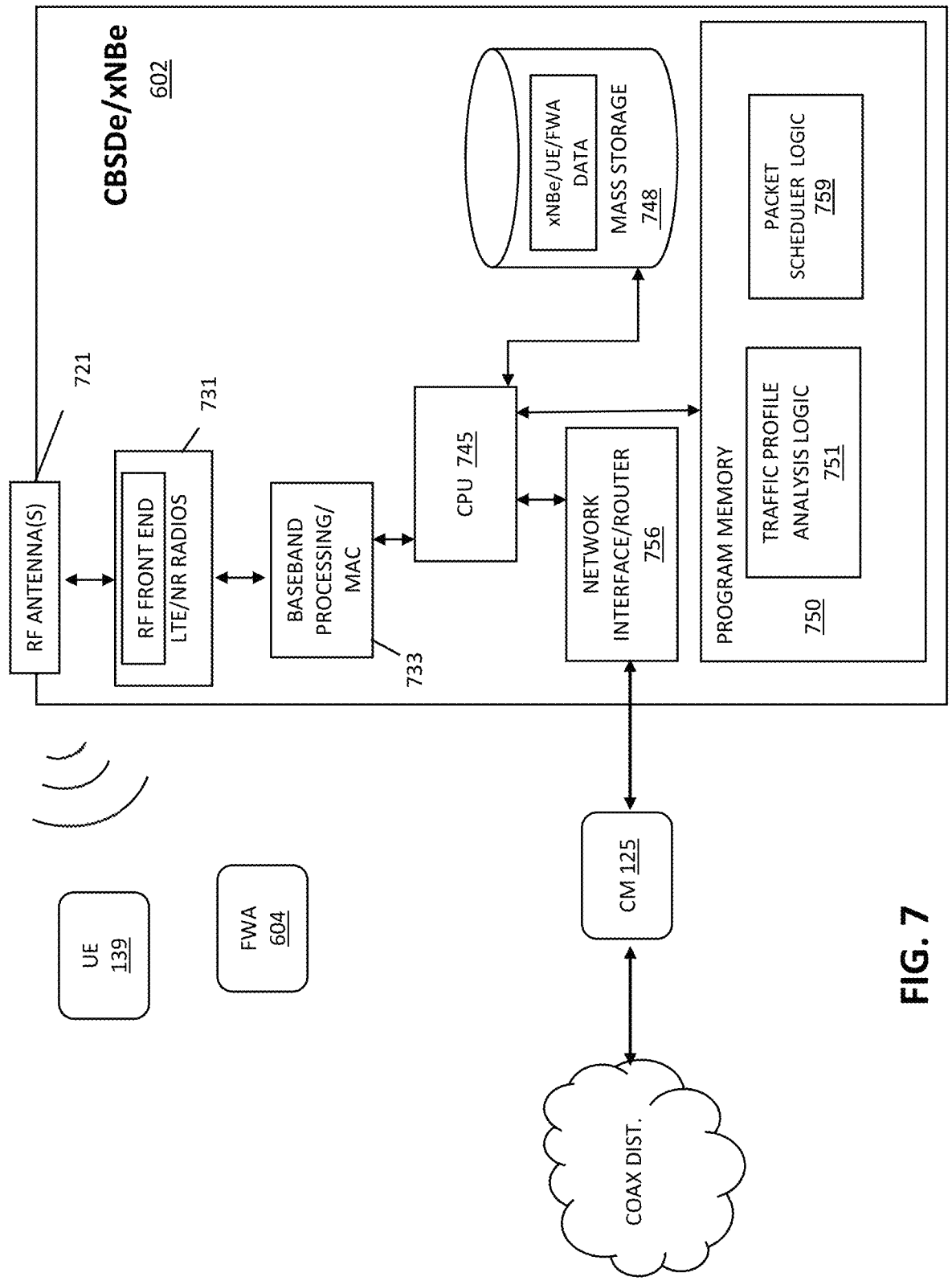
FIG. 7 is a block diagram illustrating an exemplary embodiment of a CBSDe/xNBe base station apparatus according to the present disclosure.

FIG. 7 is a block diagram illustrating one exemplary embodiment of enhanced base station (B Se) apparatus configured for provision of enhanced data traffic prioritization and scheduling functions according to the present disclosure. In this exemplary embodiment, the BSe of FIG. 6 is specifically configured as a CBSD/xNB; i.e., (i) to operate using CBRS quasi-licensed spectrum, and (ii) to utilize 3GPP 4G or 5G technology.

As shown, the CBSDe/xNBe 602 includes, inter alia, a processor apparatus or subsystem 745, a program memory module 750, mass storage 748, one or more network interfaces 756, as well as one or more radio frequency (RF) devices 731 having, inter alia, antenna(e) 721 and one or more 4G/5G radio(s).

At a high level, the CBSDe/xNBe maintains a 3GPP-compliant LTE/LTE-A/5G NR "stack" (acting as a EUTRAN eNB or 5G gNB) communications with 3GPP-compliant FWA 604, UEs (mobile devices 139), as well as any other protocols which may be required for use of the designated frequency bands such as e.g., CBRS GAA or PAL band.

As illustrated, the CBSDe/xNBe device 602 includes traffic profile analysis logic 751, and packet scheduler logic 759.

The traffic profile analysis logic 751 includes a variety of functions including receipt and assembly of configuration and traffic profile (TP) data relating to the individual CPEe 604 (discussed in greater detail below), which includes: (i) CPE ID, (ii) default bearer ID, (iii) number of Wi-Fi users served, (iv) traffic type data for each user/client, and (v) priority levels for each user/client. The CPEe identifier data (ID) is generated by the CPEe and processed by the logic 751 so as uniquely associates data (and generated scheduling) with each participating CPEe. In this latter process, the logic 751 extracts a CPEe "identifier" or other designator in the IP packet header that denotes the packet type and the CPEe identity (either generically or specifically as desired). In some embodiments, the logic 751 may be configured to utilize additional markings or identifiers to certain packets, so as to e.g., associate them with a particular function or service flow established within the scheduler logic 759 (e.g., VoIP packets, video packets, etc.).

In one variant, the logic 751 receives packets that have been addressed to certain sockets or ports within the CBSDe 602 by each CPEe.

The CBSDe packet scheduler logic 759 performs scheduling operations based on, inter alia, the traffic profile data obtained from the various CPEe being backhauled. In the exemplary embodiment, the processor 745 may include one or more of a digital signal processor, microprocessor, field-programmable gate array, GPU or plurality of processing components mounted on one or more substrates. The processor 705 may also comprise an internal cache memory, and is in communication with a memory subsystem 750, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 721 are configured to detect and transceive signals from radio access technologies (RATs) in the service area or venue with which the xNBe 602 is associated. For example, LTE (including, e.g., LTE, LTE-A, LTE-U, LTE-LAA) signals may be used as the basis of communication between the CBSD/xNBe and the various mobile devices (e.g., UEs 139) or FWA 604. The antenna(s) 721 may include multiple spatially diverse individual elements in e.g., a MIMO- or MISO-type configuration, such that spatial diversity of the transceived signals can be utilized for e.g., increase in coverage area. Spatial multiplexing (SM) may also be utilized by the xNBe 602 to enhance data throughput; i.e., by multiplexing data streams on different antennae.

In the exemplary embodiment, the radio interface(s) 731 comprise one or more LTE/5G-based radios compliant with 3GPP. Additional unlicensed, licensed, or quasi-licensed air interfaces may also be used within the XNBe 602, including e.g., non-CBRS band LTE or 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The RF radios 731 in one embodiment comprises a digitally controlled RF tuner capable of reception of signals via the RF front end (receive chain) of the RF radio(s) in the aforementioned bands, including in one variant simultaneous reception (e.g., both CBRS 3.550 to 3.700 GHz and 2.300 to 2.500 GHz, bands, CBRS and 600 to 800 MHz bands, or Band 71 and Band 12/17 in another configuration). In another variant, mmWave frequencies (e.g., 42-100 GHz) may be used by the air interface(s), especially in applications where direct LOS transmission is possible. In cases where the CBSDe 602 includes multiple such interfaces, they may also be "traded off" or used selectively with certain constituent CPEe, such as where a mmWave band interface is used to service some CPEe, and an LTE or similar interface is used for other CPEe, such as based on their reported bandwidth requirements, presence of LOS or physical obstructions between the CBSDe and the CPEe, etc.

Figure 7A:
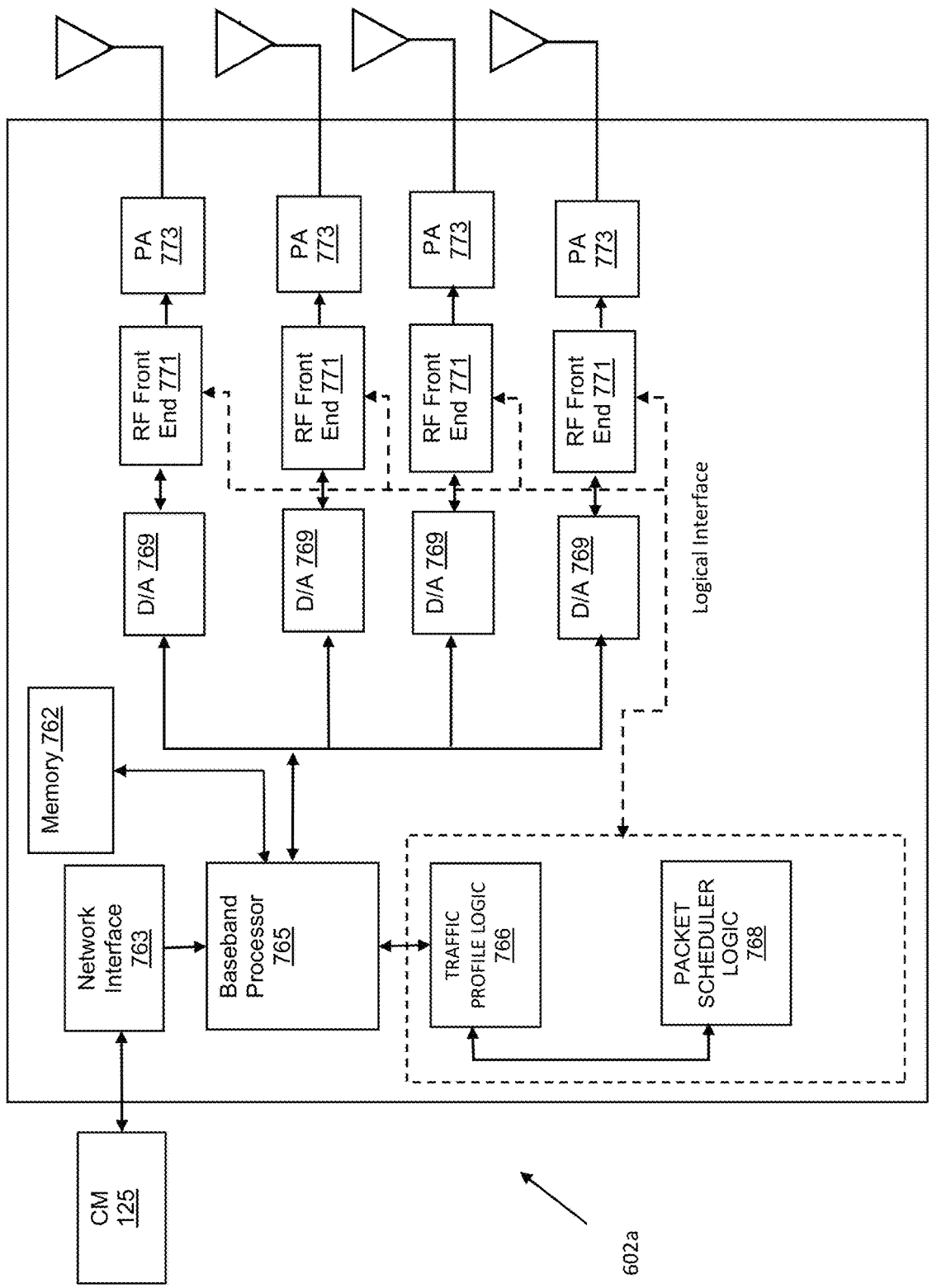
FIG. 7A is a block diagram illustrating one exemplary implementation of the base station (e.g., xNBe) of FIG. 7, illustrating different antenna and transmit/receive chains thereof.

FIG. 7A is a block diagram illustrating one exemplary implementation of the base station (e.g., xNBe) of FIG. 7, illustrating different antenna and transmit/receive chains thereof.

As illustrated, the device 602a includes baseband processor 765, one or more D/A 769, one or more RF front ends 771, one or more power amplifiers 773, traffic profile analysis logic 766, and packet scheduler logic 768. Additionally, the exemplary embodiment includes a network interface 763 that interfaces the xNBe to connect to a data network via e.g., a CM 125, such as for wireline backhaul of the CBSDe to an MSO core or headend.

The components of xNBe 602a shown in FIG. 7A may be individually or partially implemented in software, firmware or hardware. The RF front end 771 includes RF circuits to operate in e.g., licensed, quasi-licensed or unlicensed spectrum (e.g., Band 71, Bands 12-17, NR-U, C-Band, CBRS bands, mmWave, etc.). The digital baseband signals generated by the baseband processor 705 are converted from digital to analog by D/As 769. The front-end modules 713 convert the analog baseband signals radio received from D/As 769 to RF signals to be transmitted on the antennas. The baseband processor 765 includes baseband signal processing and radio control functions, including in one variant physical layer and Layer 2 functions such as media access control (MAC). The Power Amplifiers (PA) 773 receives the RF signal from RF front ends 711, and amplify the power high enough to compensate for path loss in the propagation environment.

CPEe Apparatus—

FIG. 8 illustrates one exemplary embodiment of an enhanced CPE 604 (here, configured as a CBRS FWAe; e.g., roof-mounted FWA with associated radio head and CPEe electronics) configured according to the present disclosure.

It will also be appreciated that while described in the context of a CBRS-compliant FWA, the device of FIG. 8 may be readily adapted to other spectra and/or technologies such as e.g., mmWave, Multefire, DSA, LSA, or TVWS.

In one exemplary embodiment as shown, the CPEe/FWAe 604 includes, inter alia, a processor apparatus or subsystem such as a CPU 802, flash memory or other mass storage 804, a program memory module 810 with TP (traffic profile) logic 806, 4G baseband processor module 816 with 4G/4.5G stack 818, 5G baseband processor module 812 with 5G NR stack 814 (here also implemented as software or firmware operative to execute on the processor), one or more backend interfaces 808 (e.g., USB, GbE, etc.), power module 832 (which may include the aforementioned PoE injector device), a WLAN/BLE module 834 with integrated WLAN router and antennae 836, and 5G wireless radio interface 820 and 4G/4.5G radio interface 826 for communications with the relevant RANs (e.g., 5G-NR RAN and 4G/4.5G RAN) respectively, and ultimately the EPC or NG Core 610 as applicable. The RF interfaces 820, 826 are configured to comply with the relevant PHY standards which each supports, and include an RF front end 822, 828 and antenna(s) elements 824, 830 tuned to the desired frequencies of operation (e.g., adapted for operation in 3.55-3.70 GHz band, 5 GHz for the LTE/LTE-A bands, C-Band, NR-U bands, mmWave bands, etc.). Each of the UE radios may include multiple spatially diverse individual elements in e.g., a MIMO- or MISO-type configuration, such that spatial diversity of the received signals can be utilized. Beamforming and "massive MIMO" may also be utilized within the logic of the CPEe/FWAe device.

In one embodiment, the various processor apparatus 802, 812, 816 may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 812.

The various BB processor apparatus may also comprise an internal cache memory, and a modem.

The program memory module 810 may implement one or more of direct memory access (DMA) type hardware, so as to facilitate data accesses as is well known in the art. The memory module of the exemplary embodiment contains one or more computer-executable instructions that are executable by the CPU processor apparatus 802.

In this and various embodiments, the processor subsystem/CPU 802 is configured to execute at least one computer program stored in program memory 810 (e.g., a non-transitory computer readable storage medium). A plurality of computer programs/firmware are used and are configured to perform various functions such as communication with relevant functional modules within the CPEe/FWAe 604 such as the radio head and WLAN/BLE module 834.

Other embodiments may implement the TP logic 806 functionality within dedicated hardware, logic, and/or specialized co-processors (not shown). In another embodiment, the module logic 806 is integrated with the CPU processor 802 (e.g., via on-device local memory, or via execution on the processor of externally stored code or firmware).

In some embodiments, the CPEe 604 also utilizes memory or other storage configured to temporarily hold a number of data relating to e.g., the various network/gNBe configurations for CQI generation and/or various modes. For instance, the CPEe/FWAe 604 may recall data relating to SINR to CQI mapping used with a given gNBe 602 or RAN from storage.

Exemplary Methods—

Figure 9:
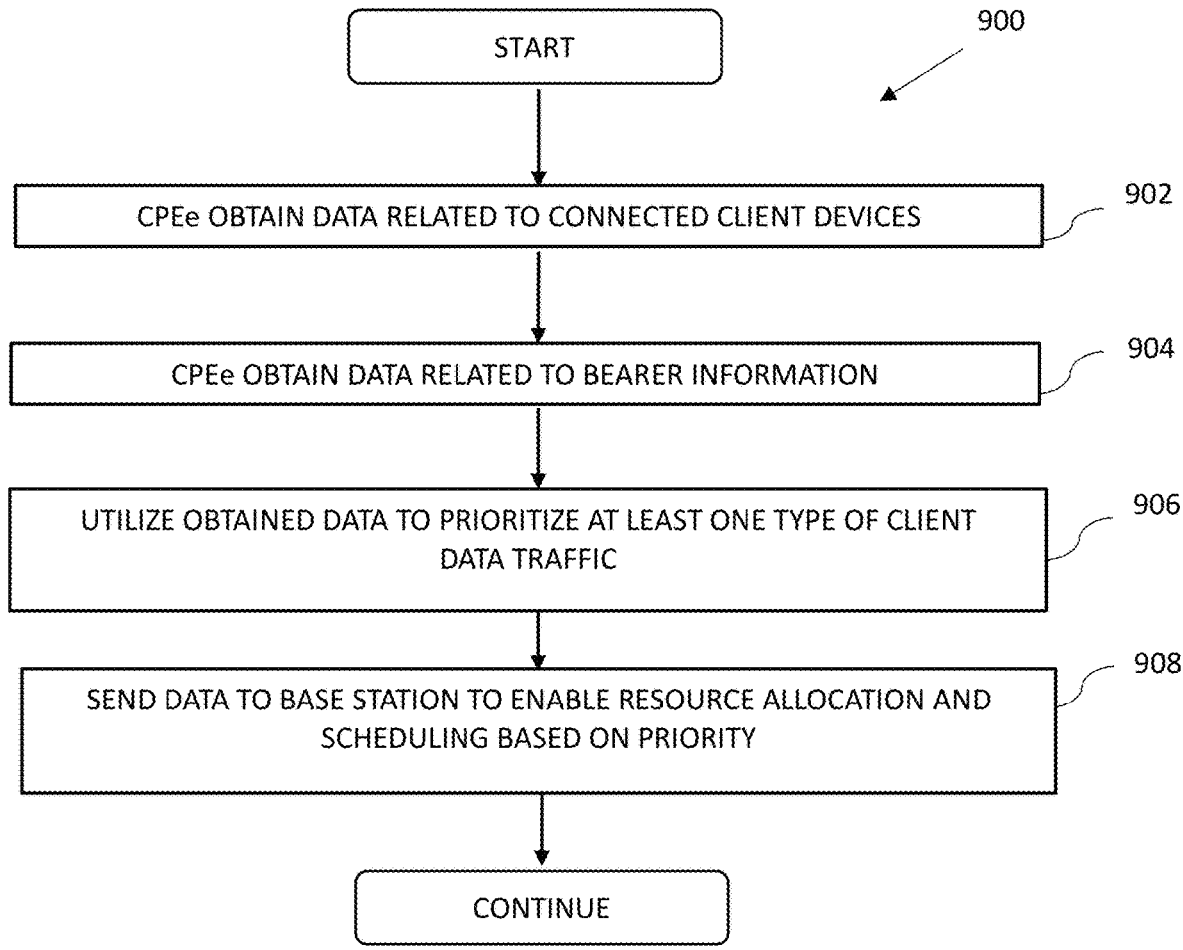
FIG. 9 is a logical flow diagram of an exemplary embodiment of a generalized method for prioritizing data traffic for one or more client devices via an enhanced CPE/FWA, according to the present disclosure.
Figure 10:
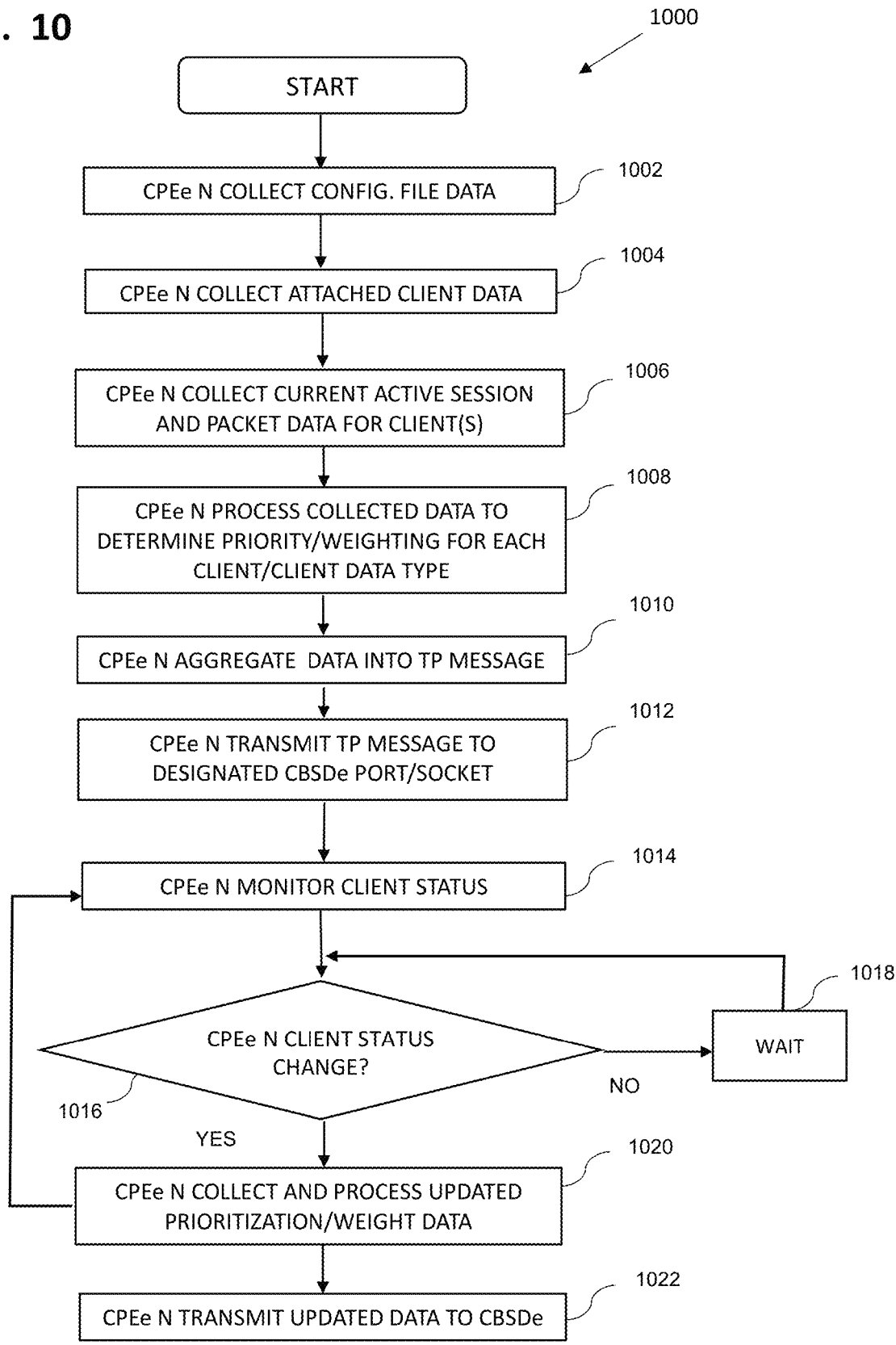
FIG. 10 is a logical flow diagram representing one implementation of the generalized method of FIG. 9 for prioritizing the data traffic for the one or more client devices.
Figure 11:
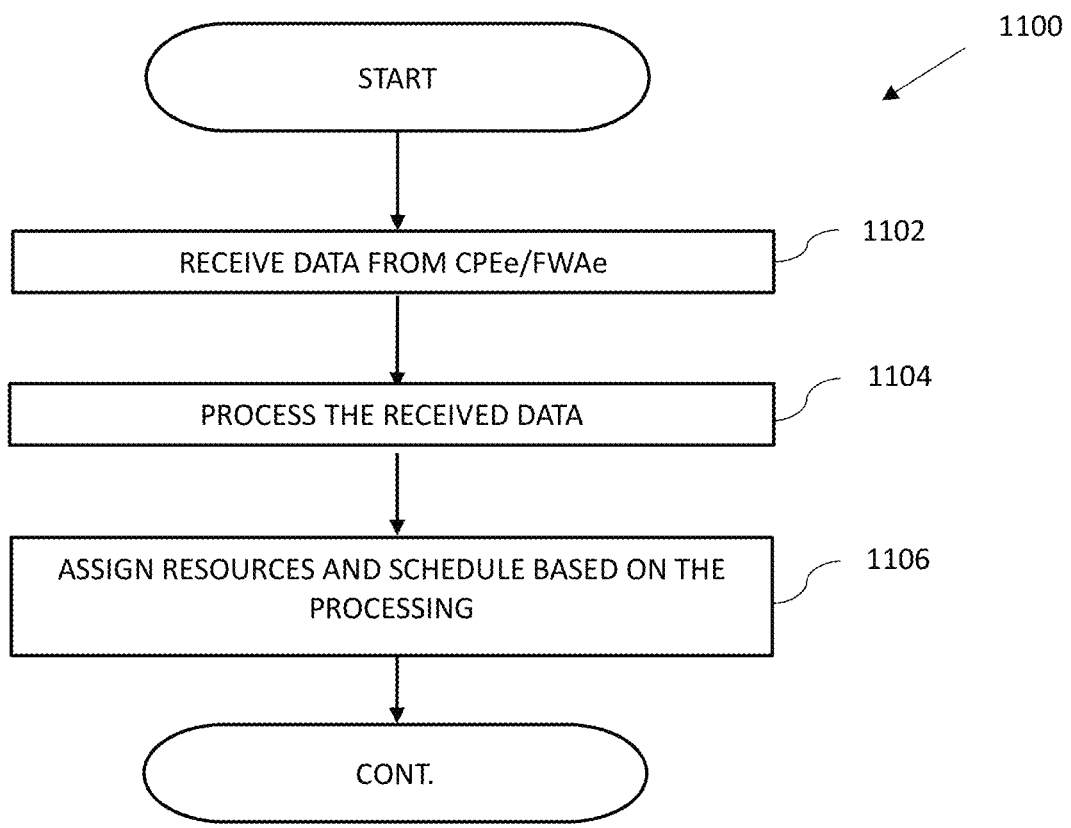
FIG. 11 is a logical flow diagram of an exemplary embodiment of a generalized method for assigning resources of a base station for prioritized data traffic associated with one or more client devices according to the present disclosure.

Methods for prioritizing data traffic delivered to multiple client devices via a BSe 602 and CPEe/FWAe 604 according the present disclosure are now described with respect to FIGS. 9-11.

Referring now to FIG. 9, one embodiment of a generalized methodology 900 for prioritizing data traffic for one or more client devices via enhanced CPE/FWA is shown and described.

At step 902, data related to one or more client devices 139 connected to a wireless router 606 are obtained. For example, such data may include a number of the connected client devices 139, as well as the type of data traffic transacted by the connected client devices. In one variant, one or more client devices 139 may request web browsing data, which is generally not very latency-sensitive, while another one or more client devices may request video data, which is more latency-sensitive than the web browsing data (since, e.g., latency affects the QoE for users consuming the video data and expecting a continuous stream). Likewise other clients may request to transact voice (e.g., VoIP) data which has some level of latency sensitivity, but higher error tolerance (i.e., can sustain higher BER without perceptible loss of quality) than video data or web or file data.

At step 904, data related to bearer information is obtained. For example, such data includes an identifying information of a default bearer assigned to the CPEe/FWAe 604 to which the wireless router 606 is connected. Additional default bearer(s) and/or dedicated bearer(s) may be assigned for the CPEe/FWAe by the CBSDe 602 depending on the traffic profile (TP) data.

Figure 9A:
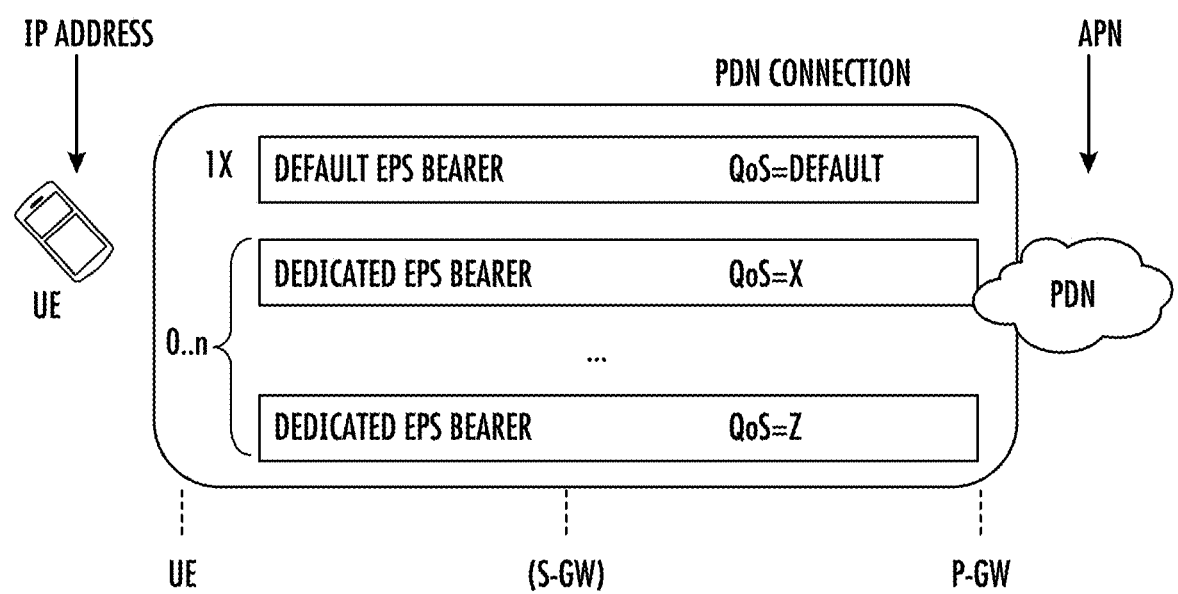
FIG. 9A is a graphical illustration of a prior art 3GPP default and dedicated bearer process.

As a brief aside, in the extant 3GPP model, a "default" bearer is assigned to a UE that connects to a data network (e.g., a 4G LTE/LTE-A network) for the first time to provide "best effort" service, and remains as long as the UE is connected to the same network. See e.g., FIG. 9A, which illustrates an exemplary prior art use case of default and dedicated bearers with a 3GPP EPS. Additional default bearers may be associated with the UE. For example, a VoIP implementation may use a first default bearer for signaling messages, a second default bearer for data traffic (e.g., via LTE connection or other), and a dedicated bearer for voice traffic and linked to the first default bearer. Each default bearer is associated with a respective IP address. In addition, a QoS Class Identifier (QCI) is a mechanism used in 3GPP-based (e.g., LTE) networks to ensure that bearer traffic is allocated appropriate QoS. Different QCI values may be associated with the bearer depending on its usage. Typically, QCI values of 5 through 9 are assigned to the default bearer, where each of these QCI values are associated with respective priority levels, packet delay budgets (in ms), packet error loss rates, and appropriate services (voice, video, gaming, chat, file transfer, email, etc.).

On the other hand, a dedicated bearer is configured to carry a specific data flow with a given QoS. More specifically, a dedicated bearer may provide a prioritized tunnel to transfer specific traffic such as VoIP (e.g., via OTT services); a dedicated bearer for other types of services (video streaming, etc.) may be set up simultaneously. Moreover, a dedicated bearer may provide a guaranteed bit rate (GBR) or may be non-GBR, while a default bearer does not have a guaranteed bit rate. GBR generally comes with a higher priority level, which benefits the specific traffic (e.g., VoIP, VoLTE) because lower priority traffic would be discarded first in a congested network environment. The dedicated bearer may be an additional bearer linked to the default bearer via an identity value (and does not require a separate IP address). The dedicated bearer must have a different QCI value with different associated QoS and capabilities, enabling different treatment of data that passes via the dedicated bearer.

Hence, in the exemplary embodiments described herein, the dedicated bearers are leveraged to give special or differentiated treatment to specific services such as OTT voice services via, e.g., aforementioned VoIP, VoLTE, or other 3GPP-based network protocols (e.g., those based on 4.5G hybrid protocols, 5G NR, etc.) on a per-client or even per-service/process basis (e.g., a VoIP application operating on a particular WLAN client served by the WLAN AP backhauled by the CPEe 604).

In one embodiment, the identifying information of the default bearer includes an IP (Internet Protocol) address associated with the default bearer.

Returning to FIG. 9, at step 906 thereof, prioritization with respect to the data traffic associated with the one or more client devices 139 can be made based on the obtained data. For example, latency-sensitive media for a given client device may be prioritized over other types of traffic, as discussed in greater detail subsequently herein.

Lastly, at step 908, data is sent to the base station (BSe) 602 to enable resources allocation and scheduling by the scheduler logic thereof. In one exemplary embodiment, the transmitted data includes the prioritization data from step 906; i.e., the prioritization is conducted by the CPEe, and forwarded to the BSe via traffic profile messaging. In other embodiments, the CPEe may provide intermediate or even raw data to the BSe for determination of priority (as well as resource allocation/scheduling) using processes thereof.

FIG. 10 illustrates one implementation 1000 of the generalized method 1000 of FIG. 9 for prioritizing the data traffic for the one or more client devices.

At step 1002, each CPEe of "N" such devices associated with the WLAN AP being backhauled by the CPEe collects configuration data regarding the CPEe, such as via a configuration file. This data may relate for example to the configuration of the CPEe air interface between itself and the CBSDe, such as whether MIMO, spatial multiplexing, and other such 3GPP features are supported. This data, in one embodiment, enables the prioritization algorithm within the CPEe to profile its own capabilities, including maximum available backhaul bandwidth that can be allocated to the various client device user plane (UP) data streams.

At step 1004, each CPEe also collects configuration data associated with the downstream devices, such as via a configuration file maintained by the WLAN AP or the CPEe itself. This data may relate for example to the type and capabilities of the WLAN AP, as well as the individual client device 139 attached thereto where available. Knowledge of e.g., the type/standards supported (e.g., 802.11g, 802.11n, 802.11ax, etc.), availability of MIMO and/or spatial multiplexing capability. MCS (modulation and coding scheme), and similar parameters can be useful to the CPEe (and even BSe scheduler in some implementations) in determining client/traffic type priority, as well as assessing the overall throughput of the WLAN AP.

Per step 1006, the data traffic carried by the CPEe can be characterized, such as via inspection of packet headers and data throughput associated with existing sessions (e.g., VoIP, video ABR streaming session, etc.) by the CPEe 604 (using e.g., a packet inspection or data throughput subroutines of the TP logic 806 of the device of FIG. 8). Information such as destination IP address or port number, which may be associated with, e.g., latency-sensitive services such as video streaming services, can also be extracted. Moreover, the payload of the data packets can be checked to identify the type of the data that are being received. Thus, the data received from a given client device 139 (or destined for that device) can be identified immediately as latency-sensitive data by the type of data identified in the payload of the received data packets (e.g., carrying video data).

In one variant, upon the foregoing identification of information within the packet headers and/or the payload of the received data packet, as well as throughput, the CPEe/FWAe 604 can immediately assign a priority or weight to the latency-sensitive data associated with the given client device per step 1008 (e.g., it is immediately identified as latency sensitive, and all packet traffic for that session is weighted accordingly, regardless of the actual volume of the traffic).

In another variant, the packet analysis may be performed over a prescribed period of time to make the foregoing assignment of the priority or the weight to certain data associated with the given WLAN client device 139. For instance, various QoS parameters (such as latency or packet loss) can be compared to a threshold over the prescribed period of time for a determination of the priority/weight assignment. Yet other variants will be recognized by those of ordinary skill given the present disclosure.

In one variant of step 1008, the CPEe TP logic 806 will assign priority level/weights for each user plane (UP) traffic type delivered to/from a Wi-Fi user. For example, priority for video data traffic may be assigned an arbitrary (dimensionless) value such as 20, priority for voice traffic (e.g., VoIP)=15; and priority for web traffic=5. Once the CPEe 604 creates these priority weights and sends the data to the CBSDe per the TP messaging (per steps 1010 and 1012 below), and the CBSDe packet scheduler uses these weights to make decisions on traffic priority (i.e., which traffic will be sent to/by the CPEe first), and what is the traffic "mix" or resource allocation will look like. For instance, in the case of video/voice/web, the amount of data sent for each traffic type would be allocated as 50/37.5/12.5 percent, respectively; that is 50% of overall RF channel bandwidth or capacity will be used to transmit the video traffic to user/users who consume video at the premises associated with the CPEe, and similarly 37.5% of overall RF capacity will be used to transmit voice traffic to users/user who consume over the top (OTT) voice service at the premises.

At step 1010, the CPEe/FWAe 604 can generate a "traffic profile" (TP) message based on the obtained/identified information from steps 1002-1008. For example, as discussed elsewhere herein, the traffic profile message includes in one implementation: (i) identifying information of CPEe/FWAe, (ii) identifying information of an assigned default bearer, (iii) number of client devices served by the CPEe/FWAe (e.g., via a wireless router), (iv) data traffic type for each client device, and (iv) prioritization/weight value of each client device or data traffic type. More or less data may be used consistent with the TP based on the given application.

The identifying information of the CPEe/FWAe and the assigned default bearer can each include, e.g., an IP address associated therewith.

The number of client devices can be readily determined by the CPEe, such as via enumeration of active connections between the AP 606 and client "STA" devices 139, via MAC address of each client maintained by the AP, or other techniques.

As noted above, session IDs, packet inspection, throughput analysis, QCI values, etc. can all be utilized to characterize the data traffic associated with various applications for purposes of prioritization.

In one variant, all participating CPEe 604 utilize a common TP message format with prescribed IE (information element) having a certain minimum population of fields. In another variant, each CPEe can select its own TP message format (e.g., to include additional information over and above a baseline IE template, such as session IDs for various processes, client configuration data, etc.), based on requests from the BSe 602, or detection of one or more conditions or client configurations necessitating the addition of further data. For instance, in one such implementation, the version of IEEE Std. 802.11 supported by the AP or a client connected to the CPEe determines the available "feature set"; later variants such as 802.11ax or be may have enhanced feature sets which can benefit from the inclusion of data by the CPEe within the TP message(s), in effect giving the BSe 602 greater visibility/granularity on the operation of the AP and/or a given client.

At step 1012, data including the traffic profile message generated at step 1010 can be sent to the base station 602, such as via control plane (CP) or IP packets addressed to a given socket or port of the BSe over the established wireless bearer(s) between the CPEe and BSe.

In one variant, based at least on the generated traffic profile message data and weighting, the CPEe/FWAe 604 (TP logic 806) can send a request to the BSe for one or more dedicated bearers to be assigned to at least a portion of the data traffic associated with the client devices 139 served by the CPEe/FWAe. For example, when an application operating on a client device requires one or more QoS levels that can be mapped to QCI values associated with a dedicated bearer (e.g., based on the type of data traffic requested by the program application on the client device), the CPEe/FWAe 604 can send a request for the one or more dedicated bearers based on the request initiated at the application layer within the client device. Hence, per-application (and per-client) dedicated bearers can be selectively established for such QoS/latency sensitive applications used by the individual WLAN clients.

In another variant, the CPEe/FWAe 604 can measure one or more QoS-related parameters (e.g., latency) associated with data communication for a given AP client device 139 (e.g., running a particular program application thereon), and determine whether prioritization and/or dedicated bearer(s) are necessary, such as by comparing the measured one or more QoS-related parameters to their respective prescribed thresholds.

Figure 10A:
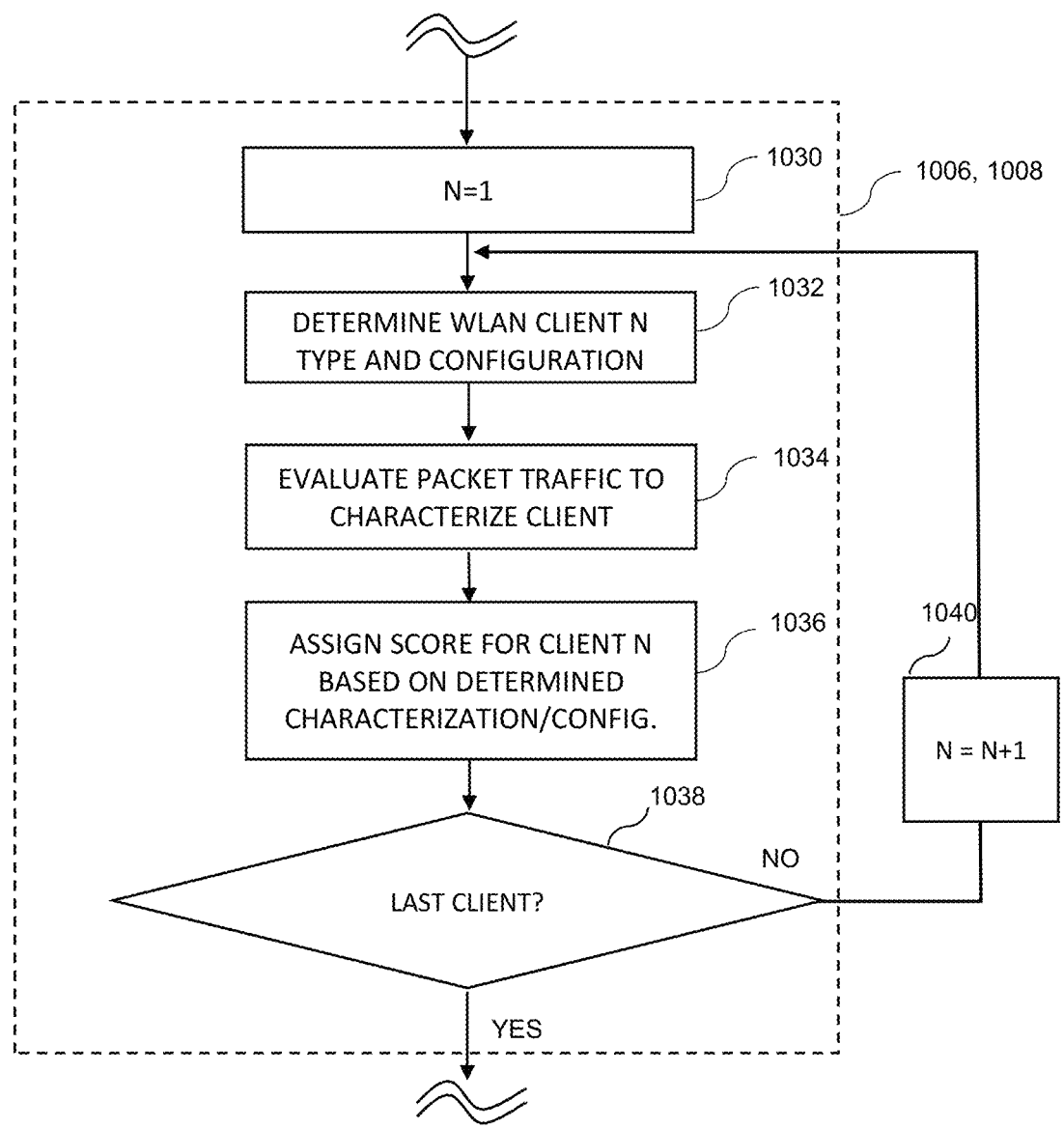
FIG. 10A is a logical flow diagram representing one implementation of the prioritization and traffic profile generation process of the method of FIG. 10.

FIG. 10A is logical flow diagram illustrating one implementation of the WLAN client evaluation process (steps 1006-1008) of FIG. 10.

In FIG. 10A, the evaluation process shown begins with a counter (N) set to an initialization value (e.g., 1) per step 1030. Next, for client N, its type and configuration are determined per step 1032, and packet traffic to/from the client is evaluated in order to characterize the individual client and its active processes per step 1034. Based on the determined characterization (which e.g., may be an average over a period of time), a score or weight value is assigned for that client per step 1036. For instance, in one implementation, the score comprises a value from 1 to 10, or a fraction/percentage (e.g., 0.70 out of possible 1.0), with higher scores indicating higher (putative) service level requirements, such as higher QoS/latency requirements, or lower BER level requirements.

Per step 1038, if the last client in the pool under consideration by the CPEe has not been evaluated for characterization, then per step 1040 the counter (N) is incremented and the data of the next client evaluated. Otherwise, the method proceeds to step 1010 in FIG. 10.

Referring now to FIG. 11, one embodiment of a generalized methodology 1100 for assigning resources of a base station (BSe) 602 for the prioritized data traffic associated with one or more client devices is shown and described.

At step 1102, first data related to CPEe/FWAe 604 is received. In one exemplary embodiment, the data includes the traffic profile message data from the CPEe/FWAe 604. As discussed elsewhere herein, the traffic profile message includes various parameters associated with the CPEe/FWAe 604 which the scheduler logic of the BSe may utilize in determining traffic scheduling/prioritization and resource allocation (including assignment of dedicated bearers).

At step 1104, the received first data from step 1102 is processed. In one exemplary embodiment, the received data can be parsed to extract information related to the CPEe/FWAe 604 (e.g., weight/priority data related to data traffic prioritization generated by the TP logic of the CPEe/FWAe 604).

For example, the data traffic associated with latency-sensitive media for one or more client devices 608 connected to the wireless router 606 will be weighted more heavily by the TP logic 806, and hence can be prioritized over other types of data traffic (e.g., for web browsing), and/or assigned one or more dedicated bearers or other resources available to the BSe. In one variant, if the ratio of client devices requesting latency-sensitive media to client devices requesting non-latency-sensitive media is less than a prescribed threshold for a given CPEe/FWAe 604 (e.g., 50:50 or less—meaning there are less client devices requesting latency-sensitive data than client devices requesting non-latency-sensitive data), such CPE/FWA 604 may not necessarily require, e.g., the one or more dedicated bearers. In another variant, dedicated bearers are assigned in there is any latency-sensitive or other traffic requiring a dedicated bearer, irrespective of the relative proportion of clients/processes associated with the CPEe having such traffic. In yet another variant, a threshold amount of data throughput of such latency-sensitive traffic is used as a trigger for establishment of a dedicated bearer.

In another example, data traffic associated with, e.g., an emergency call (e.g., enabled via VoIP to a target IP address associated with an emergency services router/provider such as a telecommunications provider web server) associated with a client device 139 can be prioritized over all other types of data traffic. While a regular voice call may not be as sensitive to such QoS parameter as latency or packet loss, it is likely important that any loss of data exchanged for the emergency call is minimized so as to ensure maximal reliability of the call session (e.g., to avoid dropouts, garbled voice which requires repeating by the speaker, etc.).

Returning to FIG. 11, at step 1106, the appropriate amount/portion of resources (e.g., RF time/frequency resources/channels) of the serving base station 602 are assigned for delivery of data to the CPEe/FWAe 604 based on the processed data (e.g., including the data traffic prioritization information based on the traffic profile message). In the case of establishment of dedicated bearers, these bearers can be individually allocated by the CPEe to individual clients 139 as a whole, or even individual processes of such individual clients, depending on the desired level of granularity. For example, in the emergency call scenario described above, any such call packets queued by the transmitting application could alone form the basis of all traffic on the dedicated bearer, even if the latter is grossly underutilized, so as to ensure no possible interference or prejudice against the emergency call packets by another application also allocated to the same bearers (e.g., a video streaming application which could feasibly "clog" the bearer with video/media packets at the expense of the VoIP emergency call packets).

Figure 12:
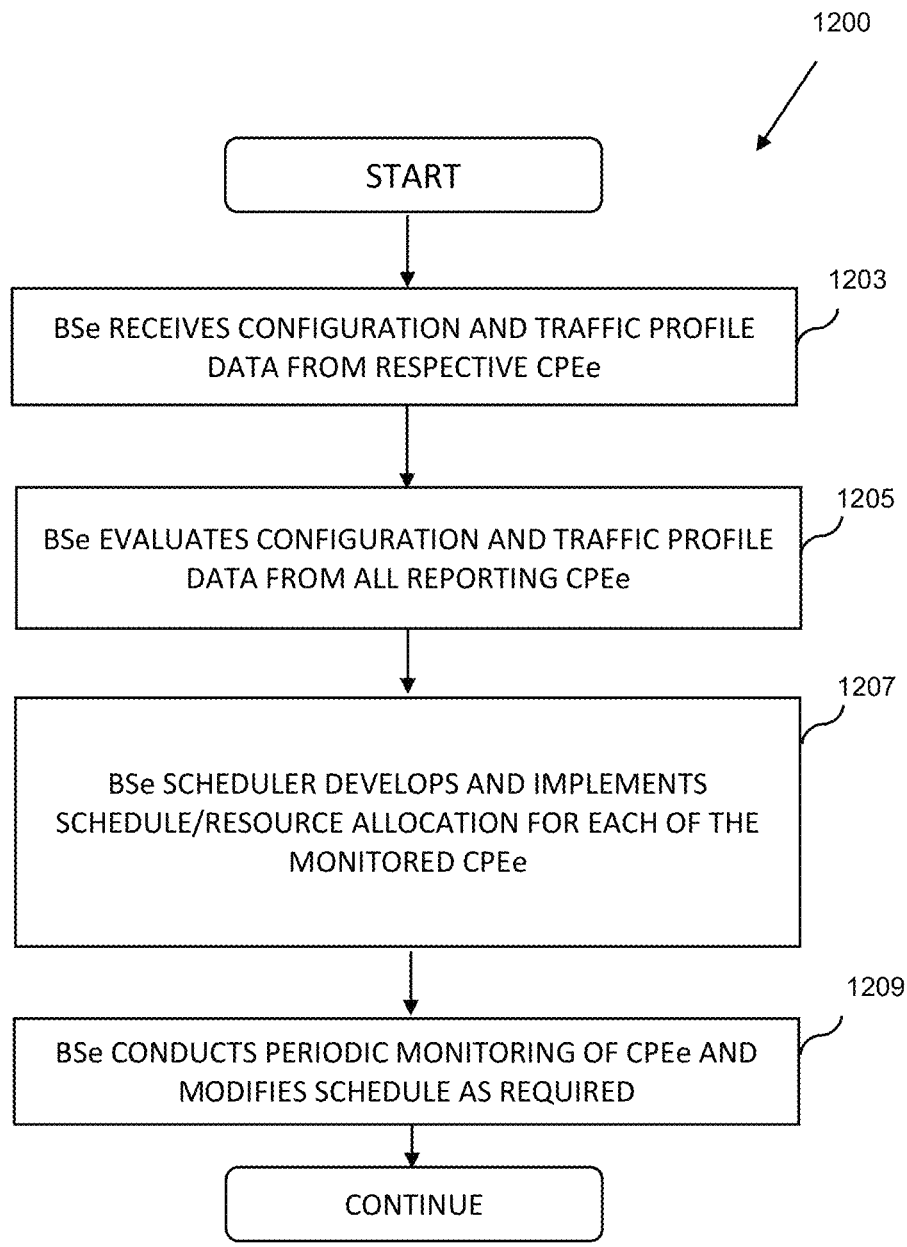
FIG. 12 is a logical flow diagram representing one implementation of the generalized method of FIG. 11.

FIG. 12 illustrates one implementation of the generalized method of FIG. 11.

At step 1203 of the method 1200, the base station (e.g., BSe) connects to the CPEe (such connection which may be pre-existing). This connection enables two-way transaction of data between the devices, including passing of one or more respective TP messages from the various CPEe to the BSe. The BSe 602 may also communicate configuration and use data to the CPEe. This data may include for instance data indicative of (i) the xNBe configuration in terms of supported technology types; (ii) the current geographic location of the xNBe (which will generally be within a prescribed proximity of the CPEe, to the extent that the location of the latter is known, such as via a premises service address); and (iii) other data which may be used by the CPEe in optimizing its configuration for data exchange with the BSe.

For example, data relating to the XNBe technology type may be general (e.g., highest technology capable of being supported, such as 4G or 5G NR, Release 8-13 or Release 15-17, etc.) or highly granular, such as regarding specific features of each technology (e.g., whether the xNBe supports multiple diversity channels, SM (spatial multiplexing, and hence enhanced data throughput), or whether Dynamic Spectrum Sharing or DSS (e.g., 4G and 5G "coexistence" modes where one or more carrier are shared) are supported/enabled). For example, a 5G NR gNB device with 8-MIMO antenna and SM capability enabled may provide, at maximal load, many times the bandwidth of a first-generation LTE (4G) eNB, and may even cause the CPEe to obviate use of logic limiting resource (e.g., dedicated bearer) requests—stated differently, in some embodiments, a CPEe with limited backhaul bandwidth available may be configured to behave differently, including limiting the number/type of dedicated bearer requests to the serving BSe, than a CPEe which is backhauled by an ultra-high bandwidth mmWave or such BSe wherein bandwidth is much less constrained.

Per step 1205, the BSe receives the transmitted data from the different CPEe devices and evaluates the configuration/traffic priority data contained therein relating to each particular client device. In one variant, the data is associated with a client ID or other unique identifier which allows the BSe to maintain a correlation table (e.g., LUT) or other data structure which enables the BSe scheduler logic to determine characteristics/prioritization versus specific client device at any given point in time. Moreover, further granularity can be achieved by correlating (in a related LUT or database) individual applications or processes of the given client with prioritization data. The serving/connected CPEe may also be identified therein, such that the BSe (or its backhauling DOCSIS CM/CMTS infrastructure) can, if desired, form larger-scale relationships between individual CPEe "strands" served by the BSe (such as identification of common physical service groups (pSGs) or "virtual" service groups (vSGs), examples of the latter described in co-owned and co-pending U.S. patent application Ser. No. 16/986,131 filed Aug. 5, 2020 and entitled "APPARATUS AND METHODS FOR OPTIMIZING CAPACITY IN WIRELINE CABLE NETWORKS WITH VIRTUAL SERVICE GROUPS," which is incorporated herein by reference in its entirety).

Scheduling decisions are then made by the BSe scheduler (step 1207), such as where the additional connected devices associated with a given BSe (e.g., N CPEe) are included in scheduling evaluations and resource allocation/prioritization. The present disclosure also explicitly contemplates embodiments of the BSe scheduler which can differentiate treatment/scheduling for "strands" having differing types/capabilities of CPEe and/or client devices. For instance, the scheduler may "double weight" a given CPEe known to have high bandwidth capability (e.g., a 5G NR compliant CPEe), and which services several 802.11ax capable AP/clients, versus another CPEe with only 4G capability and e.g., an 802.11ac AP.

Lastly, per step 1209, the BSe conducts periodic monitoring of all CPEe (as applicable) within the designated scheduling pool, and the schedule generated in step 1207 is modified by the BSe scheduler accordingly. This monitoring may be e.g., periodic polling-based, event-driven (such as on a status change), pushed by logic on the CPEe, or other approach.

It will be appreciated by those of ordinary skill, given the foregoing, that there are many algorithms that the BSe 602 can employ for the prioritization of traffic and allocation of RF resources (including dedicated bearers). In one implementation according to the present disclosure, the base station 602 can selectively schedule only, e.g., latency-sensitive data for prioritized delivery to the CPEe/FWAe 604 by placing such data in the queues/buffer(s) associated with the data delivery to that CPEe/FWAe 604 first, before other types of data, in effect guaranteeing that all prioritized data is transmitted before any other traffic is transmitted. The base station 602 can then schedule other, non-latency-sensitive data for subsequent deliveries.

Furthermore, it is noted that in a typical deployment, there are more than one CPEe/FWAe 604 wirelessly connected to a single BSe 602, thus reducing the amount of resources associated with the base station 602 that can be available for each CPEe/FWAe 604. Therefore, the traffic prioritization information received from the CPEe/FWAe 604 according to the present disclosure will advantageously enable more efficient allocation of the resources of the base station 602 so as to maximize the amount of resources available to each CPEe/FWAe 604, and minimize the impact on the QoE of the users by prioritizing the data that are more likely to impact the QoE (such as for example media traffic).

Additionally, given the limited/fixed amount of resources available for each CPEe/FWAe 604, the prioritization applied for a particular CPEe/FWAe 604 would not affect data delivery (e.g., scheduling thereof) to other CPE/FWA and thereby enable coexistence of the CPEe/FWAe implementing the data traffic prioritization logic according to the present disclosure with non-managed and/or legacy CPE/FWA that may not generate any prioritization data.

Moreover, in the exemplary context of a wireless system utilizing the quasi-licensed spectrum technologies such as CBRS discussed above, the SAS 202 can withdraw allocated PAL or GAA spectrum at any time—which would mean that the client devices served by one or more base stations (e.g., CBSDe) 602 within such a system may experience reduce amount of resources available for data delivery at least temporarily until new spectrum is allocated. The prioritization of the data traffic according to the present disclosure can advantageously allow, e.g., the latency-sensitive data to be prioritized so as to minimize the impact on the QoE of the users consuming the data in the network during such transitions.

Figure 12A:
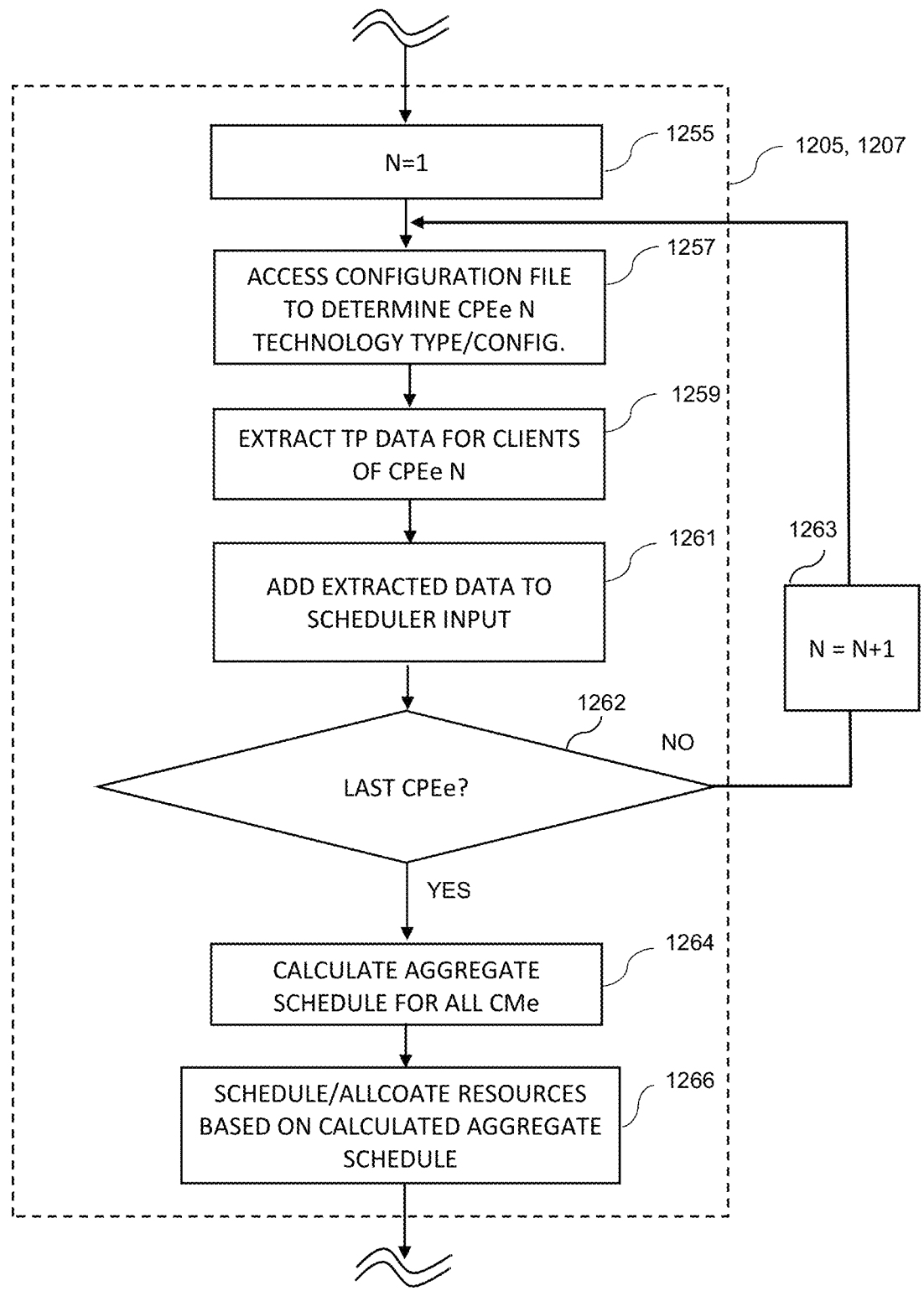
FIG. 12A is a logical flow diagram representing one implementation of the data aggregation and scheduling process of the method of FIG. 12.

FIG. 12A illustrates one implementation of the method 1200 of FIG. 12 (steps 1205-1207 thereof). As shown in FIG. 12A, the BSe 602 first sets a counter (N) to an initialized value; here, N=1, at step 1255.

The BSe then accesses a configuration file associated with the Nth CPEe being evaluated (step 1257) to determine technology type and configuration, such as the 3GPP Release the given CPEe is compliant with presence of MIMO/spatial multiplexing capability, maximum data rates, modulation orders/MCS schemes, and other data which may assist the scheduler in characterizing the technology type of that particular CPEe.

Per step 1259, the TP message(s) from the relevant CPEe are processed to extract the data contained therein, including priority/weight data, number of clients associated, etc. Per step 1261, the relevant extracted data is used as a scheduler input; i.e., correlating the data to the particular CPEe so that the BSe scheduler logic may evaluate not only individual CPEe but the pool of managed CPEe devices (and their clients) as a whole.

Per step 1262, when all the data has been extracted for each managed CPEe 604, the scheduler logic then generates an "aggregate" schedule wherein prioritization and resource allocations (including dedicated bearer instantiation) are produced for all managed CPEe per step 1264, and the schedule/resources applied to the CPEe based thereon (step 1266). Otherwise, the next CPEe is evaluated per counter increment of step 1263 and subsequent performance of steps 1257-1261.

Figure 13:
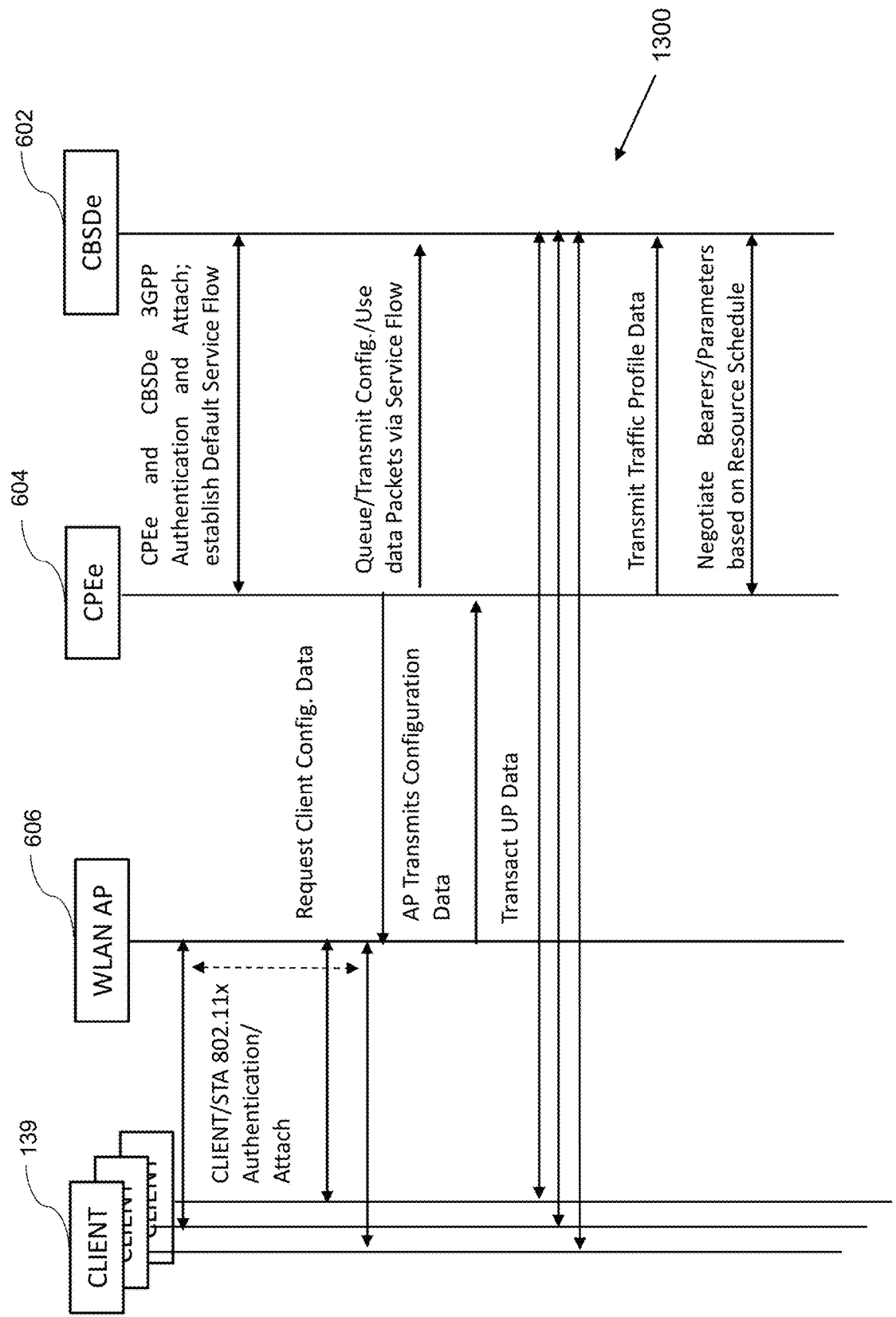
FIG. 13 is a ladder diagram illustrating communication and data flow between UE(s), CBSDe/xNBe, and FWAe, according to one embodiment of the present disclosure.

FIG. 13 is a ladder diagram illustrating communication and data flow between UE(s), CBSDe/xNBe, and FWAe, according to one embodiment of the present disclosure. In this exemplary scenario, the individual WLAN clients 139 associated with a given "strand" CPEe 604 first authenticate and attach to the WLAN AP 606. Subsequent thereto, the CPEe requests client configuration data from the WLAN AP, and the AP returns this data to the CPEe. For instance, in one variant, software/firmware on the WLAN AP is configured to identify clients uniquely (e.g., by their MAC address or other means as previously described), and obtain configuration data relating thereto for storage within a local database maintained by the CPEe via the foregoing request/response.

Thereafter, the various clients 139 (e.g., a VoIP or streaming video application thereof) transacts UP (user plane) data—from the 3GPP CPEe's perspective—with e.g., a distant web server or other such entity via the wireless backhaul of the CPEe/BSe. Based on the UP data, the CPEe is able to profile the operation of each client, including current types of applications running, throughput rate, and other aspects relating thereto, and this data (including any weightings or prioritization which may be performed by the CPEe TP logic processes 806) is then passed to the BSe 602 in order to allow subsequent negotiation and instantiation of dedicated bearers, resource scheduling, etc. via extant 3GPP protocols.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for prioritizing data communications associated with a plurality of computerized client devices served by a Citizens Broadband Radios Service (CBRS) fixed wireless access (FWA) apparatus, the computerized method comprising:
   obtaining, at the CBRS FWA apparatus, first data related to data traffic associated with one or more of the plurality of computerized client devices;
   characterizing, by the CBRS FWA apparatus, the data traffic based at least on the obtained first data;
   prioritizing, by the CBRS FWA apparatus, the data traffic based at least on the characterizing; and
   wirelessly transmitting, from the CBRS FWA apparatus, second data indicative of the prioritizing to a Citizens Broadband Radios Service (CBRS)-compliant Citizens Broadband Service Device (CBSD) which is in data communication with the CBRS FWA apparatus and disposed upstream from the CBRS FWA apparatus in a network architecture;
   wherein the wirelessly transmitting, from the CBRS FWA apparatus, of the second data indicative of the prioritizing to the CBRS-compliant CBSD enables the CBRS-compliant CBSD to determine (i) which data traffic type will be sent from the CBRS-compliant CBSD to the CBRS FWA apparatus first, and (ii) an allocation of an amount of data distribution for each data traffic type.

2. The computerized method of claim 1, wherein the obtaining of the first data comprises obtaining data associated with types of data traffic transacted by the plurality of computerized client devices.

3. The computerized method of claim 1, wherein the characterizing comprises determining identification data associated with a communication channel associated with the CBRS FWA apparatus, the identification data comprising an Internet Protocol (IP) address of the communication channel, the communication channel comprising a default data bearer assigned to the CBRS FWA apparatus by the CBRS-compliant CBSD.

4. The computerized method of claim 1, further comprising performing, via the CBRS FWA apparatus, a packet analysis of data traffic generated from the plurality of computerized client devices.

5. The computerized method of claim 1, further comprising generating data representative of a data traffic profile associated with the CBRS FWA apparatus, the data traffic profile based at least on the obtained first data and the characterizing.

6. The computerized method of claim 5, wherein the wirelessly transmitting of the second data indicative of the prioritizing comprises transmitting the generated data representative of the data traffic profile associated with the CBRS FWA apparatus in an information element (IE) of a control plane (CP) protocol message.

7. The computerized method of claim 1, wherein: the wirelessly transmitting comprises transmitting via one or more CBRS carriers within a frequency band of 3.550 to 3.700 GHz.

8. The computerized method of claim 1, wherein prioritizing the data traffic based at least on the characterizing comprises allocating respective weight values to each of a plurality of different user plane (UP) data traffic types.

9. A CBRS (Citizens Broadband Radios Service)-compliant FWA (fixed wireless access) apparatus configured for data communication with a CBRS-compliant CBSD (Citizens Broadband Service Device) and a plurality of computerized client devices in a wireless system, the CBRS-compliant FWA apparatus comprising:

processor apparatus; and storage apparatus in data communication with the processor apparatus, the storage apparatus comprising at least one computer program configured to, when executed by the processor apparatus, cause the CBRS-compliant FWA apparatus to:

obtain first data related to the plurality of computerized client devices;

prioritize data traffic associated with at least one computerized client device of the plurality of computerized client devices based at least on a plurality of data traffic types;

transmit data indicative of the prioritization to the CBRS-compliant CBSD, the transmitted data indicative of the prioritization comprising data indicative of a total number of client devices then-currently consuming traffic via the CBRS-compliant FWA apparatus; and receive user plane (UP) data for the plurality of computerized client devices via a plurality of resource blocks (RBs) scheduled by a scheduler process of the CBRS-compliant CBSD and based at least on the transmitted data;

wherein the transmitted data enables the CBRS-compliant CBSD to establish at least one dedicated bearer based on a ratio of a portion of the total number of the client devices requesting one or more of the plurality of data traffic types associated with latency-sensitivity to a second portion of the total number of the client devices requesting one or more of the plurality of data traffic types associated with non-latency-sensitivity being more than a prescribed threshold.

10. The CBRS-compliant FWA apparatus of claim 9, wherein the prioritized data traffic comprises data traffic associated with latency-sensitive application operating on the at least one computerized client device.

11. The CBRS-compliant FWA apparatus of claim 9, wherein the transmitted data indicative of the prioritization comprises one or more Internet Protocol (IP) messages addressed to a particular socket or port on the CBRS-compliant CBSD.

12. The CBRS-compliant FWA apparatus of claim 9, wherein the at least one computer program is further configured to, when executed by the processor apparatus, cause the CBRS-compliant FWA apparatus to:

determine the total number of client devices consuming traffic via the CBRS-compliant FWA apparatus via enumeration of active connections between the CBRS-compliant FWA apparatus and client devices via use of respective MAC addresses of the client devices maintained by the CBRS-compliant FWA apparatus.

13. Computer readable apparatus comprising a non-transitory storage medium, the non-transitory storage medium comprising at least one computer program having a plurality of instructions, the plurality of instructions configured to, when executed on a processing apparatus, cause a CBRS (Citizens Broadband Radios Service)-compliant FWA (fixed wireless access) apparatus to:

obtain first data related to data traffic associated with a plurality of computerized client devices;

characterize each of the plurality of computerized client devices based at least on the obtained first data;

determine whether prioritization of at least a portion of the data traffic is necessary for one or more of the plurality of computerized client devices, the determination comprising a comparison of one or more measured QoS (quality of service)-related parameters associated with the one or more of the plurality of computerized client devices to one or more respective prescribed thresholds;

based on the determination, cause prioritization of the data traffic, the prioritization based at least on the respective characterizations of each of the plurality of computerized client devices; and wirelessly transmit second data indicative of the prioritization to a CBRS-compliant CBSD (citizens broadband service device) which is in data communication with the CBRS-compliant FWA apparatus.

14. The computer readable apparatus of claim 13, wherein the wireless transmission comprises transmission via one or more CBRS carriers within a frequency band of 3.550 to 3.700 GHz.

15. The computer readable apparatus of claim 13, wherein the wireless transmission of the second data comprises at least one traffic profile (TP) message, the at least one TP message comprising data relating to one or more applications operative on the one or more of the plurality of computerized client devices, respectively, the one or more of the plurality of computerized client devices serviced by the CBRS-compliant FWA apparatus.

16. The computer readable apparatus of claim 13, wherein the wireless transmission of the second data comprises respective at least one traffic profile (TP) messages, each of the at least one TP messages comprising (i) data relating to individual ones of data traffic types for respective ones of the plurality of computerized client devices, and (ii) priority data associated with each of the plurality of computerized client devices, the one or more of the plurality of computerized client devices serviced by the CBRS-compliant FWA apparatus.

17. The computer readable apparatus of claim 13, wherein:

the obtainment of the first data comprises receipt of data relating to a configuration of an air interface of the CBRS-compliant FWA apparatus between the CBRS-compliant FWA apparatus and the CBRS-compliant CBSD;

the plurality of instructions are further configured to, when executed on the processing apparatus, cause the CBRS-compliant FWA apparatus to:

characterize one or more capabilities of the CBRS-compliant FWA apparatus based at least on the received data, the one or more capabilities comprising maximum available backhaul bandwidth that can be allocated to one or more user plane (UP) data streams associated with the one or more of the plurality of computerized client devices; and the prioritization of the data traffic is further based at least on the characterization of the one or more capabilities.

18. The computer readable apparatus of claim 17, wherein the characterization of each of the plurality of computerized client devices based at least on the obtained first data comprises assignment of a priority level for each of the one or more UP data streams.

19. The computer readable apparatus of claim 13, wherein the characterization comprises:

characterization of a first one of the plurality of computerized client devices to (i) determine at least a configuration of the first one of the plurality of computerized client devices, (ii) evaluation at least a portion of the first data associated with the first one of the plurality of computerized client devices, and (ii) assign a score for the first one of the plurality of computerized client devices based at least on the configuration and the evaluation; and incrementation of a counter to characterize a next one of the plurality of computerized client devices, the incrementation continuing until each of the plurality of computerized client devices have been characterized.

20. The computer readable apparatus of claim 13, wherein the plurality of instructions are further configured to, when executed on the processing apparatus, cause the CBRS-compliant FWA apparatus to:

based on the second data indicative of the prioritization, transmit data representative of a request to the CBRS-compliant CBSD for one or more dedicated bearers to be assigned to at least a portion of the data traffic, the request based on at least one application operating on at least one of the plurality of computerized client devices requiring one or more quality of service (QOS) levels mapped to one or more QoS class identifier (QCI) values associated with the one or more dedicated bearers.

* * * * *